US012344361B2

(12) United States Patent
Mineo

(10) Patent No.: US 12,344,361 B2
(45) Date of Patent: Jul. 1, 2025

(54) VESSEL PROPULSION APPARATUS, VESSEL, AUXILIARY MACHINE-EQUIPPED ENGINE, AND TORQUE FLUCTUATION ABSORBER

(71) Applicant: YAMAHA HATSUDOKI KABUSHIKI KAISHA, Iwata (JP)

(72) Inventor: Shigeharu Mineo, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 469 days.

(21) Appl. No.: 17/969,845

(22) Filed: Oct. 20, 2022

(65) Prior Publication Data

US 2023/0167858 A1 Jun. 1, 2023

(30) Foreign Application Priority Data

Nov. 30, 2021 (JP) ................................ 2021-194872

(51) Int. Cl.

*B63H 21/14* (2006.01)
*B63H 23/06* (2006.01)
*B63H 23/34* (2006.01)
*F02B 39/04* (2006.01)
*F02B 39/12* (2006.01)

(52) U.S. Cl.

CPC ............ *B63H 21/14* (2013.01); *B63H 23/06* (2013.01); *B63H 23/34* (2013.01); *F02B 39/04* (2013.01); *F02B 39/12* (2013.01)

(58) Field of Classification Search

CPC .. F02B 33/40; F02B 39/04; F02B 9/12; F04C 29/005; F04C 18/107; F16H 48/285; B63H 21/14; B63H 23/06; B63H 23/34

See application file for complete search history.

(56) References Cited

U.S. PATENT DOCUMENTS 4,844,044 A * 7/1989 McGovern ............. F04C 29/06 464/57
4,944,278 A * 7/1990 Woodard ............... F02B 33/38 464/62.1
4,944,279 A * 7/1990 Woodard ............. F04C 29/005 464/65.1

(Continued)

FOREIGN PATENT DOCUMENTS

CN 115467922 A * 12/2022
JP 58093931 A * 6/1981

*Primary Examiner* — Jake Cook

(74) *Attorney, Agent, or Firm* — Keating & Bennett, LLP

(57) ABSTRACT

A torque fluctuation absorber includes a first outer helical spline, an intermediate member, an outer member, a first spring, and a second spring. The first outer helical spline is rotatable integrally with a torque transmission shaft. The intermediate member is able to move in a first axial direction and in a second axial direction. The intermediate member is linked with the torque transmission shaft through a first helical spline coupling including the first outer helical spline. Axial movement of the outer member with respect to the torque transmission shaft is regulated. The outer member is linked with the intermediate member through a second helical spline coupling. The first spring biases the intermediate member in the first axial direction. The second spring biases the intermediate member in the second axial direction.

16 Claims, 14 Drawing Sheets

(56) References Cited

U.S. PATENT DOCUMENTS

| | | | | | |
|---|---|---|---|---|---|
| 4,953,517 | A * | 9/1990 | McGovern | F04C 29/005 | 464/62.1 |
| 4,989,410 | A * | 2/1991 | Smith | F02B 39/12 | 60/624 |
| 6,253,747 | B1 * | 7/2001 | Sell | F02B 33/34 | 418/206.5 |
| 7,637,792 | B1 * | 12/2009 | Davis | B63H 23/02 | 416/169 R |
| 7,681,559 | B2 * | 3/2010 | Pratley | F02B 39/12 | 464/57 |
| 8,091,534 | B2 * | 1/2012 | Mineo | F02B 67/06 | 123/559.3 |
| 8,151,772 | B2 * | 4/2012 | Wilflinger | F02B 39/12 | 123/559.3 |
| 10,578,011 | B2 * | 3/2020 | Naruoka | F01D 25/186 | |
| 2007/0079796 | A1 | 4/2007 | Mineo | | |

* cited by examiner

VESSEL PROPULSION APPARATUS, VESSEL, AUXILIARY MACHINE-EQUIPPED ENGINE, AND TORQUE FLUCTUATION ABSORBER

CROSS REFERENCE TO RELATED APPLICATIONS

This application claims the benefit of priority to Japanese Patent Application No. 2021-194872 filed on Nov. 30, 2021. The entire contents of this application are hereby incorporated herein by reference.

BACKGROUND OF THE INVENTION

1. Field of the Invention

The present invention relates to a vessel propulsion apparatus, a vessel, an auxiliary machine-equipped engine, and a torque fluctuation absorber.

2. Description of the Related Art

Conventionally, in small vessels, automobiles, and others, air is compressed by using a supercharger and supplied to an engine. US 2007/0079796 A1 has disclosed an installation structure of a supercharger. According to this structure, a driving gear of the supercharger is provided with a one-way clutch as a torque fluctuation absorber. When an engine is decreased in rotational frequency upon deceleration or the like to result in a sudden torque fluctuation, the one-way clutch is actuated to absorb the torque fluctuation.

SUMMARY OF THE INVENTION

The inventor of preferred embodiments of the present invention described and claimed in the present application conducted an extensive study and research regarding a vessel propulsion apparatus, a vessel, an auxiliary machine-equipped engine, and a torque fluctuation absorber such as the one described above, and in doing so, discovered and first recognized new unique challenges and previously unrecognized possibilities for improvements as described in greater detail below.

Absorption of a torque fluctuation caused when an engine is increased in rotational frequency upon acceleration or the like of the engine is also preferable.

Preferred embodiments of the present invention provide vessel propulsion apparatuses, vessels, auxiliary machine-equipped engines, and torque fluctuation absorbers which are each capable of absorbing a bidirectional torque fluctuation.

In order to overcome the previously unrecognized and unsolved challenges described above, a preferred embodiment of the present invention provides a vessel propulsion apparatus including an engine that includes a crank shaft, a supercharger that includes an input shaft, a gear train that includes a plurality of gears to transmit a driving force from the crank shaft to the supercharger, and a torque fluctuation absorber to absorb a fluctuation in torque transmitted to the gear train. The torque fluctuation absorber includes a first outer helical spline, an intermediate member, an outer member, a first spring, and a second spring. The first outer helical spline is rotatable integrally with a torque transmission shaft which includes at least one of the crank shaft, the input shaft, and an intermediate shaft located in a torque transmission path from the crank shaft to the input shaft. The intermediate member coaxially surrounds the torque transmission shaft, and is able to move in a first axial direction and in a second axial direction which is an opposite direction to the first axial direction. The intermediate member includes a first inner helical spline on an inner circumference thereof and a second outer helical spline on an outer circumference thereof. The first inner helical spline is engaged with the first outer helical spline to provide a first helical spline coupling. The outer member coaxially surrounds the torque transmission shaft, and is regulated in axial movement with respect to the torque transmission shaft. The outer member includes teeth on an outer circumference thereof and a second inner helical spline on an inner circumference thereof. The teeth mesh with corresponding gears of the gear train. The second inner helical spline is engaged with the second outer helical spline to provide a second helical spline coupling. The first spring biases the intermediate member in the first axial direction. The second spring biases the intermediate member in the second axial direction.

According to this structural arrangement, the torque fluctuation absorber includes the intermediate member, the outer member, the first spring to bias the intermediate member in the first axial direction, and the second spring to bias the intermediate member in the second axial direction. The teeth which mesh with corresponding gears of the gear train are provided on the outer circumference of the outer member. The intermediate member coaxially surrounds the torque transmission shaft. The intermediate member is able to move in the first axial direction and in the second axial direction. The intermediate member is linked with the torque transmission shaft through the first helical spline coupling and linked with the outer member through the second helical spline coupling. When a torque fluctuation occurs in the torque transmission path, due to actions of the first and the second helical spline coupling, the intermediate member is moved in the second axial direction in resistance to the first spring. It is also moved in the first axial direction in resistance to the second spring. Therefore, it is possible to absorb a bidirectional torque fluctuation.

In a preferred embodiment of the present invention, the vessel propulsion apparatus further includes an inner member which coaxially surrounds the torque transmission shaft, is regulated in axial movement with respect to the torque transmission shaft, and is rotatable integrally with the torque transmission shaft. The first outer helical spline is provided on an outer circumference of the inner member. According to this structural arrangement, the inner member which surrounds the torque transmission shaft coaxially is regulated in axial movement with respect to the torque transmission shaft and is rotatable integrally with the torque transmission shaft. The first outer helical spline to provide the first helical spline coupling is provided on the outer circumference of the inner member. The torque fluctuation absorber may have a higher versatility by using the inner member.

In a preferred embodiment of the present invention, the torque fluctuation absorber further includes a base which coaxially surrounds the torque transmission shaft and is fixed to the torque transmission shaft. On an outer circumference of the base, the inner member is rotatable integrally therewith while being regulated in axial movement. The torque fluctuation absorber further includes a first support and a second support, each of which includes an annular linkage that is linked with the base and regulated in axial movement with respect to the base and an annular extension which extends outward in a radial direction from the annular linkage. The first support and the second support regulate an axial movement of the outer member between their respective extensions. The first spring is interposed between the annular extension of the first support and the intermediate member. The second spring is interposed between the annular extension of the second support and the intermediate member.

According to this structural arrangement, the inner member is able to rotate integrally with respect to the base fixed to the torque transmission shaft and also regulated in axial movement. The annular linkage of the first support and the annular linkage of the second support are linked with the base and also regulated in axial movement with respect to the base. Therefore, the first support and the second support are regulated in axial movement with respect to the base. The outer member is regulated in axial movement between the annular extension of the first support and the annular extension of the second support. When a torque fluctuation occurs in the torque transmission path, due to actions of the first or the second helical spline coupling, the intermediate member interposed between the outer member and the inner member is moved in the first axial direction or in the second axial direction. When the intermediate member is moved in the second axial direction, the first spring is compressed between the annular extension of the first support and the intermediate member. When the intermediate member is moved in the first axial direction, the second spring is compressed between the annular extension of the second support and the intermediate member. Therefore, it is possible to absorb a bidirectional torque fluctuation.

In a preferred embodiment of the present invention, at least one of the annular extension of the first support and the annular extension of the second support supports the outer member so as to rotate coaxially with the torque transmission shaft. According to this structural arrangement, it is possible to support the outer member so as to be rotatable coaxially with the torque transmission shaft by at least one of the annular extension of the first support and the annular extension of the second support.

In a preferred embodiment of the present invention, one of the annular extension of the first support and the annular extension of the second support supports the outer circumference of the outer member so as to be rotatable coaxially with the torque transmission shaft. The other of the annular extension of the first support and the annular extension of the second support supports the inner circumference of the outer member so as to be rotatable coaxially with the torque transmission shaft. According to this structural arrangement, it is possible to support each of the outer circumference and the inner circumference of the outer member so as to rotate by the annular extension of a corresponding support.

In a preferred embodiment of the present invention, at least one of the annular extension of the first support and the annular extension of the second support supports the intermediate member so as to be rotatable coaxially with the torque transmission shaft. According to this structural arrangement, it is possible to support the intermediate member so as to rotate coaxially with the torque transmission shaft by at least one of the annular extension of the first support and the annular extension of the second support.

In a preferred embodiment of the present invention, either one of the first support and the second support is unitary and integral with the base. The other of the first support and the second support is fitted onto the outer circumference of the base and supported while being regulated in axial movement with respect to the base. According to this structural arrangement, either one of the first support and the second support is integral with the base as a single member. Therefore, it is possible to make the structure simple.

In a preferred embodiment of the present invention, the torque fluctuation absorber further includes a housing which houses the inner member, the intermediate member, the first spring, and the second spring. The housing is defined by the base, the outer member, the first support, and the second support. According to this structural arrangement, it is possible to house the inner member, the intermediate member, the first spring, and the second spring in the housing defined by the base, the outer member, the first support, and the second support.

In a preferred embodiment of the present invention, the torque fluctuation absorber further includes a sub-assembly which includes the base, the inner member, the intermediate member, the outer member, the first spring, and the second spring. According to this structural arrangement, it is possible to assemble the sub-assembly in advance and incorporate the sub-assembly in the torque transmission shaft. It is, therefore, possible to improve ease of assembly.

In a preferred embodiment of the present invention, the first spring and the second spring have a different spring constant from each other. According to this structural arrangement, depending on a direction in which the intermediate member moves upon occurrence of a torque fluctuation, a spring load to resist the movement of the intermediate member is able to be different.

In a preferred embodiment of the present invention, the first spring has a larger spring constant than the second spring. According to this structural arrangement, the spring load of the first spring to resist a movement of the intermediate member in the second axial direction is able to be larger than the spring load of the second spring to resist a movement of the intermediate member in the first axial direction.

In a preferred embodiment of the present invention, the first spring includes a disc spring, and the second spring includes a helical compression spring. According to this structural arrangement, the disc spring as the first spring may be increased in spring constant progressively in relation to a flexing displacement. Therefore, a high spring load may be obtained in resistance to the movement of the intermediate member in the second axial direction. It is possible to enhance the effect of absorbing a torque fluctuation.

In a preferred embodiment of the present invention, at least one of the first inner helical spline and the second outer helical spline is inclined with respect to a central axis of the intermediate member so that the intermediate member is moved in the second axial direction, which is a direction in which the first spring is compressed when a positive torque is transmitted from the crank shaft to the supercharger. According to this structural arrangement, when a positive torque is transmitted from the crank shaft to the supercharger, the intermediate member is moved in the second axial direction, which is a direction in which the first spring higher in spring constant is compressed. Therefore, a torque fluctuation is effectively absorbed.

Another preferred embodiment of the present invention provides a vessel which includes the vessel propulsion apparatus. According to this structural arrangement, it is possible to provide the same effects as those of the vessel propulsion apparatus in each of the preferred embodiments described above.

Another preferred embodiment of the present invention provides an auxiliary machine-equipped engine which includes an engine that includes a crank shaft, an auxiliary machine that includes an input shaft, a gear train that includes a plurality of gears to transmit a driving force from the crank shaft to the auxiliary machine, and a torque fluctuation absorber to absorb a fluctuation in torque transmitted to the gear train. The torque fluctuation absorber includes a first outer helical spline, an intermediate member, an outer member, a first spring, and a second spring. The first outer helical spline is rotatable integrally with a torque transmission shaft that includes at least one of the crank shaft, the input shaft, and an intermediate shaft located in a torque transmission path from the crank shaft to the input shaft. The intermediate member coaxially surrounds the torque transmission shaft, and is able to move in a first axial direction and in a second axial direction which is an opposite direction to the first axial direction. The intermediate member includes a first inner helical spline on an inner circumference thereof. The first inner helical spline is engaged with the first outer helical spline to provide a first helical spline coupling. The intermediate member includes a second outer helical spline on an outer circumference thereof. The outer member coaxially surrounds the torque transmission shaft, and is regulated in axial movement with respect to the torque transmission shaft. The outer member includes teeth on an outer circumference thereof. The teeth mesh with corresponding gears of the gear train. The outer member includes a second inner helical spline on an inner circumference thereof. The second inner helical spline is engaged with the second outer helical spline to provide a second helical spline coupling. The first spring biases the intermediate member in the first axial direction. The second spring biases the intermediate member in the second axial direction.

According to this structural arrangement, the intermediate member is linked with the torque transmission shaft through the first helical spline coupling and linked with the outer member through the second helical spline coupling. When a torque fluctuation occurs in the torque transmission path, due to actions of the first or the second helical spline coupling, the intermediate member is moved in the second axial direction in resistance to the first spring or moved in the first axial direction in resistance to the second spring. Therefore, it is possible to absorb a bidirectional torque fluctuation in the auxiliary machine-equipped engine.

Another preferred embodiment of the present invention provides a torque fluctuation absorber to absorb a fluctuation in torque transmitted to a gear train including a plurality of gears. The torque fluctuation absorber includes a first outer helical spline, an intermediate member, an outer member, a first spring, and a second spring. The first outer helical spline is rotatable integrally with a torque transmission shaft. The intermediate member coaxially surrounds the torque transmission shaft, and is able to move in a first axial direction and in a second axial direction which is an opposite direction to the first axial direction. The intermediate member includes a first inner helical spline on an inner circumference thereof. The first inner helical spline is engaged with the first outer helical spline to provide a first helical spline coupling. The intermediate member includes a second outer helical spline on an outer circumference thereof. The outer member coaxially surrounds the torque transmission shaft, and is regulated in axial movement with respect to the torque transmission shaft. The outer member includes teeth on an outer circumference thereof. The teeth mesh with corresponding gears of the gear train. The outer member includes a second inner helical spline on an inner circumference thereof. The second inner helical spline is engaged with the second outer helical spline to provide a second helical spline coupling. The first spring biases the intermediate member in the first axial direction. The second spring biases the intermediate member in the second axial direction.

According to this structural arrangement, the intermediate member is linked with the torque transmission shaft through the first helical spline coupling and linked with the outer member through the second helical spline coupling. When a torque fluctuation occurs in a torque transmission path, due to actions of the first or the second helical spline coupling, the intermediate member is moved in the second axial direction in resistance to the first spring or moved in the first axial direction in resistance to the second spring. Therefore, it is possible to absorb a bidirectional fluctuation in torque transmitted to the gear train.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
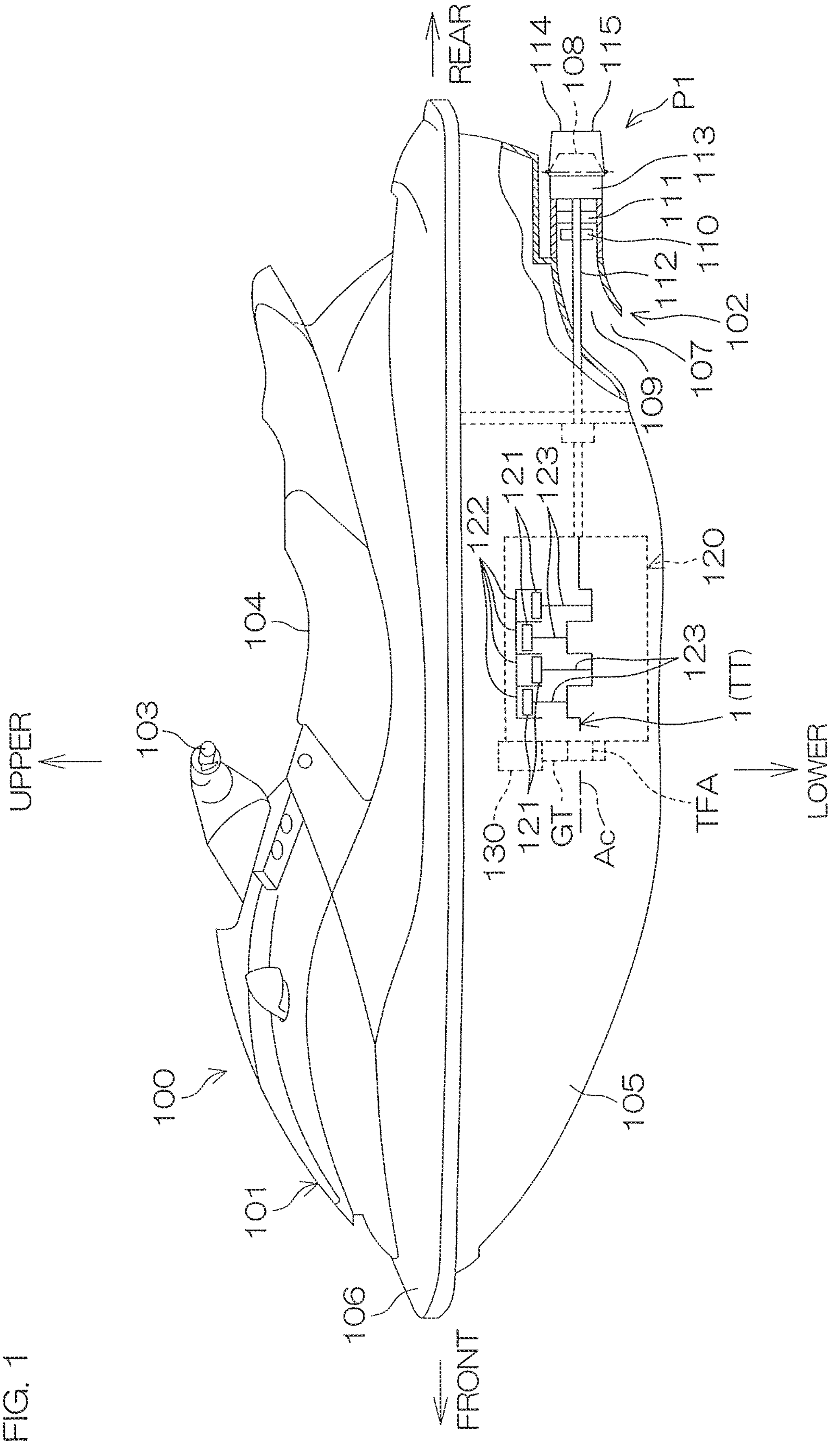
FIG. 1 is a schematic view which shows a left side surface of a jet propulsion watercraft that includes a vessel propulsion apparatus according to a preferred embodiment of the present invention.

FIG. 1 is a schematic view which shows a left side surface of a vessel including a vessel propulsion apparatus according to a preferred embodiment of the present invention. As shown in FIG. 1, a vessel 100 includes a vessel body 101, and a vessel propulsion apparatus P1 which propels the vessel body 101. The vessel propulsion apparatus P1 includes a jet pump 102 which propels the vessel body 101 and an engine 120 which drives the jet pump 102. The jet pump 102 suctions water from a vessel bottom by a driving force of the engine 120 and jets out the water to the outside of the vessel body 101. The vessel of the present preferred embodiment is a jet propulsion watercraft. The vessel 100 further includes a handle 103 operated from side to side by a crew member and a seat 104 occupied by the crew member.

The vessel body 101 includes a hull 105 which floats on the surface of water and a deck 106 which is located higher than the water surface. The deck 106 is located above the hull 105 which provides the vessel bottom. The engine 120 is located between the hull 105 and the deck 106 in an up/down direction. The engine 120 is located inside an engine room provided in an interior of the vessel body 101. The jet pump 102 is located behind the engine 120.

The jet pump 102 includes an intake 107 which is open at the vessel bottom, an outlet 108 which jets rearward water suctioned through the intake 107, and a flow channel 109 which guides the water suctioned through the intake 107 to the outlet 108. The jet pump 102 further includes an impeller 110 (rotor vane) and a stator vane 111 which are disposed in the flow channel 109 as well as a drive shaft 112 which rotates together with the impeller 110. The jet pump 102 also includes a nozzle 113 which defines the outlet 108 and a deflector 114 which deflects the direction of water flow that flows rearward from the nozzle 113 to the right side or the left side. The deflector 114 defines a jet port 115 which opens rearward.

An output of the engine 120 is adjusted by a crew member that operates a throttle lever provided in the handle 103. When the engine 120 rotates the drive shaft 112, the impeller 110 is rotated around a center line of the drive shaft 112 generating a suction force that suctions water outside the vessel from the intake 107 to the flow channel 109. The water suctioned into the flow channel 109 passes through the impeller 110, the stator vane 111, the nozzle 113, and the deflector 114 in this order and is jetted rearward from the jet port 115 of the deflector 114. Thus, a thrust to propel the vessel 100 forward is generated. Further, the deflector 114 is pivoted from side to side depending on operation of the handle 103 and, therefore, a direction in which water is jetted from the jet pump 102 is changed to the right side or to the left side depending on the operation of the handle 103. Thus, the vessel 100 is steered.

The engine 120 is an internal combustion engine. The engine 120 includes a crank shaft 1 capable of rotating around a crank axis Ac that extends in a front and rear direction. The engine 120 includes a plurality of cylinders 122 which respectively house a plurality of pistons 121 that reciprocate in an up/down direction and a connecting rod 123 that links each of the plurality of pistons 121 with the crank shaft 1.

The engine 120 further includes a supercharger 130, a gear train GT which transmits a driving force from the crank shaft 1 to the supercharger 130, and a torque fluctuation absorber TFA which absorbs a fluctuation in torque transmitted to the gear train GT.

Figure 2:
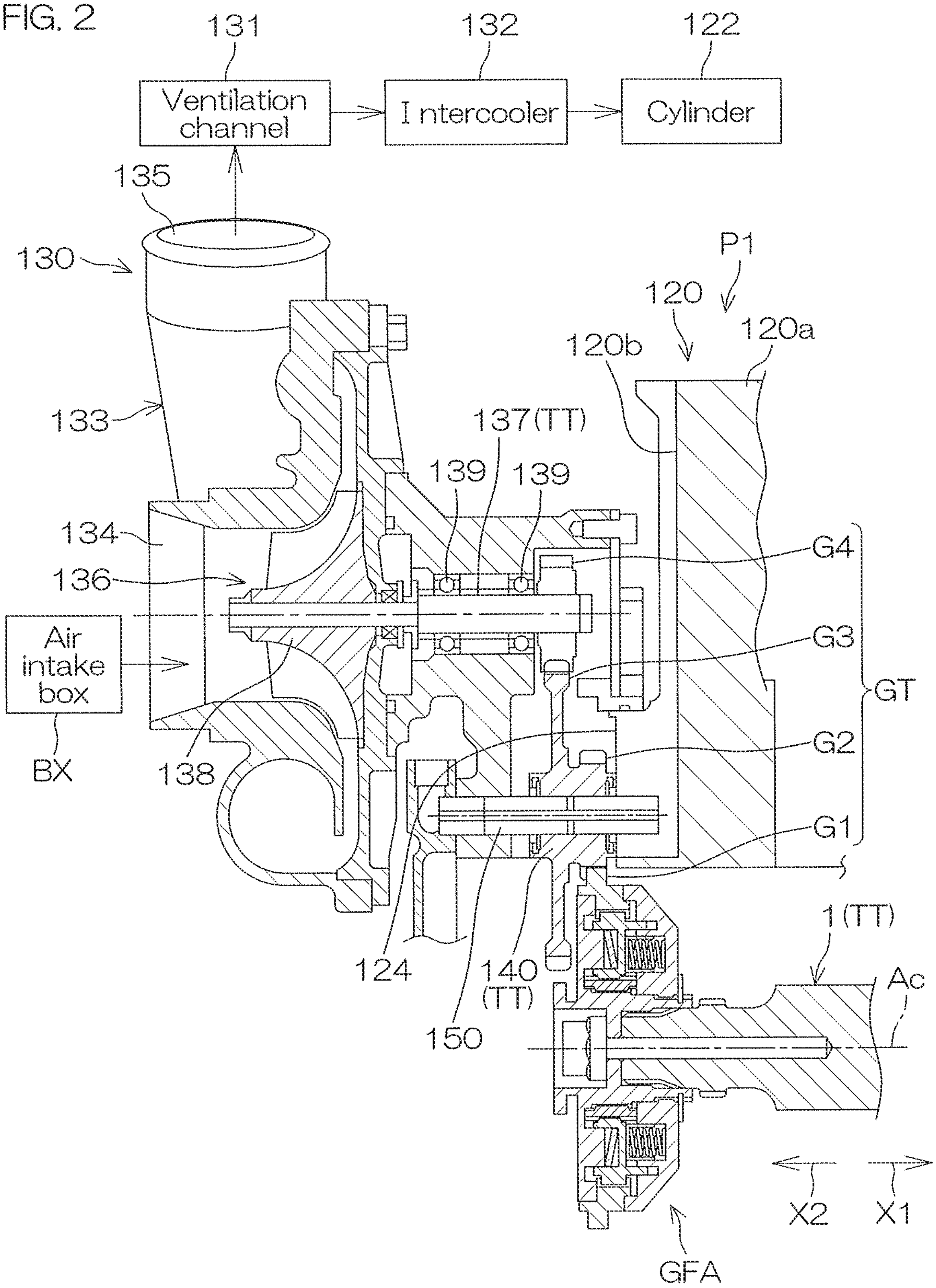
FIG. 2 is a cross-sectional view which shows a supercharger, a gear train, and a torque fluctuation absorber installed on an engine.

FIG. 2 is a cross-sectional view of the supercharger 130, the gear train GT, and the torque fluctuation absorber TFA which are installed on the engine 120. The crank shaft 1 protrudes from a front end 120*b* of a body 120*a* of the engine 120. Hereinafter, the direction of extension from a protruding portion of the crank shaft 1 to an interior of the engine 120 is referred to as a first axial direction X1, and an opposite direction to the first axial direction X1 is referred to as a second axial direction X2. The supercharger 130 compresses air due to the power from the crank shaft 1. The supercharger 130 is a mechanical supercharger (S/C). The supercharger 130 is arranged to compress air due to the power transmitted from the crank shaft 1. The supercharger 130 includes a ventilation channel 131 and an intercooler 132.

The ventilation channel 131 connects the supercharger 130 with each of the cylinders 122 of the engine 120. Compressed air which has been compressed by the supercharger 130 passes through the ventilation channel 131 and flows into each of the cylinders 122. The intercooler 132 is located in the ventilation channel 131. The intercooler 132 is located to cool high-temperature compressed air flowing through the ventilation channel 131.

The gear train GT includes a plurality of gears to transmit a driving force of the crank shaft 1 to the supercharger 130. A preferred example of the gear train GT includes a driving gear G1, a first intermediate gear G2, a second intermediate gear G3, and a driven gear G4.

The supercharger 130 includes a housing 133 which includes an air intake port 134 and an ejection port 135. The housing 133 is installed on an installation portion 124 provided at the front end 120*b* of the body 120*a* of the engine 120. The air intake port 134 takes in air fed from an air intake box BX. The ejection port 135 sends the air taken in from the air intake port 134 to the intercooler 132. A rotary portion 136 is installed in an interior of the housing 133. The rotary portion 136 includes an input shaft 137 and an impeller 138. The input shaft 137 is supported by the housing 133 so as to rotate through a bearing 139. The impeller 138 is linked with one end portion of the input shaft 137 and rotates integrally with the input shaft 137. The impeller 138 is disposed inside the air intake port 134.

As the driven gear G4, an input gear is installed on the other end portion of the input shaft 137. The driven gear G4 is linked with the driving gear G1 through the first intermediate gear G2 and the second intermediate gear G3. The first intermediate gear G2 and the second intermediate gear G3 are located coaxially on an intermediate shaft 140 functioning as a torque transmission shaft which is located in a torque transmission path from the crank shaft 1 to the input shaft 137 of the supercharger 130. The intermediate shaft 140 is a hollow shaft. A supporting shaft 150 which is fixed to the housing 133 is inserted into the intermediate shaft 140. A central axis of the supporting shaft 150 and a central axis of the intermediate shaft 140 are parallel or substantially parallel to the crank axis Ac. The intermediate shaft 140 is supported by the supporting shaft 150 so as to rotate through a bearing (not shown).

The first intermediate gear G2 and the second intermediate gear G3 are located on an outer circumference of the intermediate shaft 140 and separated in an axial direction of the intermediate shaft 140. The first intermediate gear G2 and the second intermediate gear G3 rotate integrally with the intermediate shaft 140. The first intermediate gear G2 is engaged with the driving gear G1. The second intermediate gear G3 is engaged with the driven gear G4. When the crank shaft 1 is rotated by actuation of the engine 120, a rotary force thereof is transmitted to the input shaft 137 through the gear train GT which includes the driving gear G1, the first intermediate gear G2, the second intermediate gear G3, and the driven gear G4. Thus, the impeller 138 is rotated. Air which is introduced into the air intake port 134 is compressed by the rotation of the impeller 138 and ejected from the ejection port 135. The compressed air ejected from the ejection port 135 is cooled by the intercooler 132 and, thereafter, supplied to each of the cylinders 122 of the engine 120.

Figure 3:
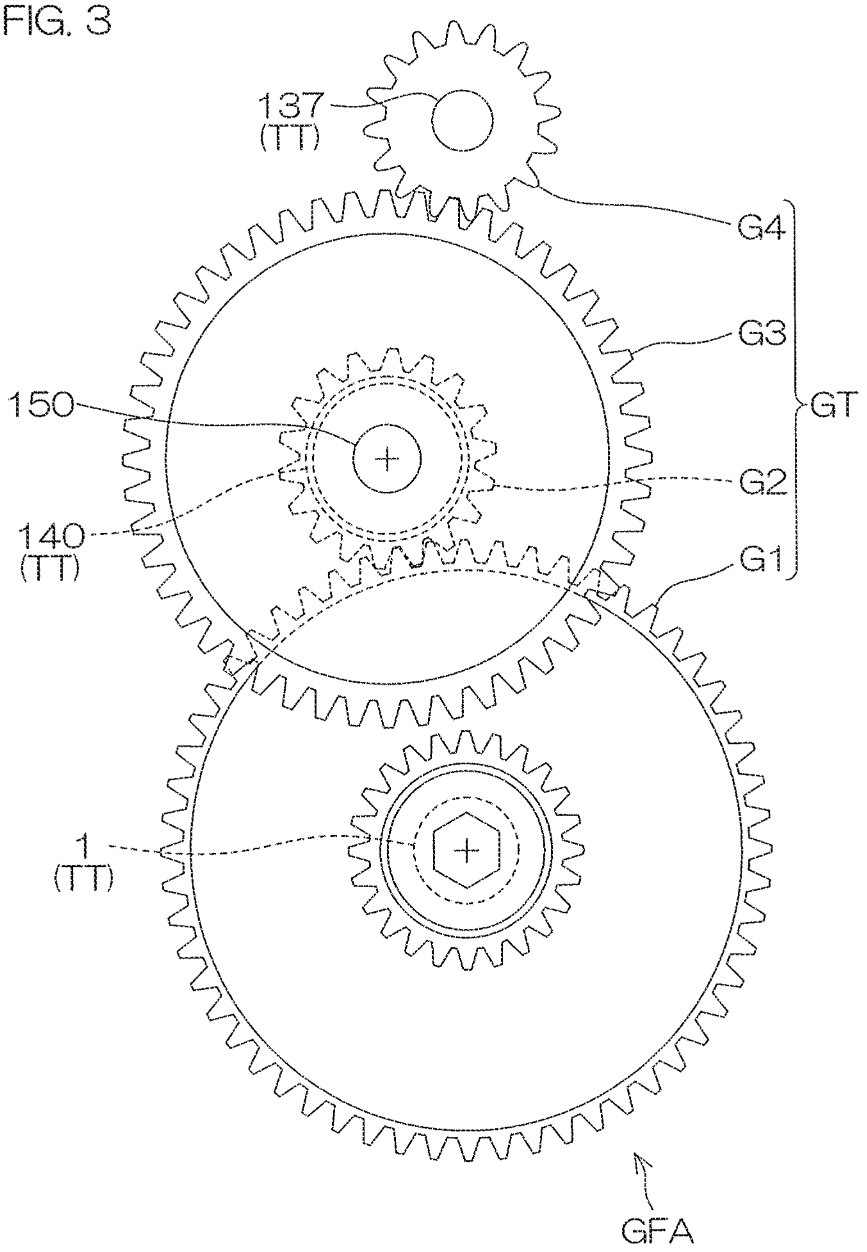
FIG. 3 is a schematic front view of the gear train.

FIG. 3 is a schematic front view of the gear train GT. As shown in FIG. 3, the first intermediate gear G2 is a gear having an outer diameter smaller than that of the driving gear G1. Therefore, the intermediate shaft 140 is rotated at a rotational speed higher than that of the crank shaft 1. The second intermediate gear G3 is a gear having an outer diameter larger than that of the first intermediate gear G2. The second intermediate gear G3 is a gear having an outer diameter larger than that of the driven gear G4. Therefore, the input shaft 137 of the supercharger 130 is rotated at a rotational speed higher than that of the intermediate shaft 140. Each of the crank shaft 1, the intermediate shaft 140, and the input shaft 137 of the supercharger 130 is a component of the torque transmission shaft TT. The torque fluctuation absorber TFA is disposed at least on one torque transmission shaft TT. In the present preferred embodiment, the torque fluctuation absorber TFA is located around the crank shaft 1.

Figure 4:
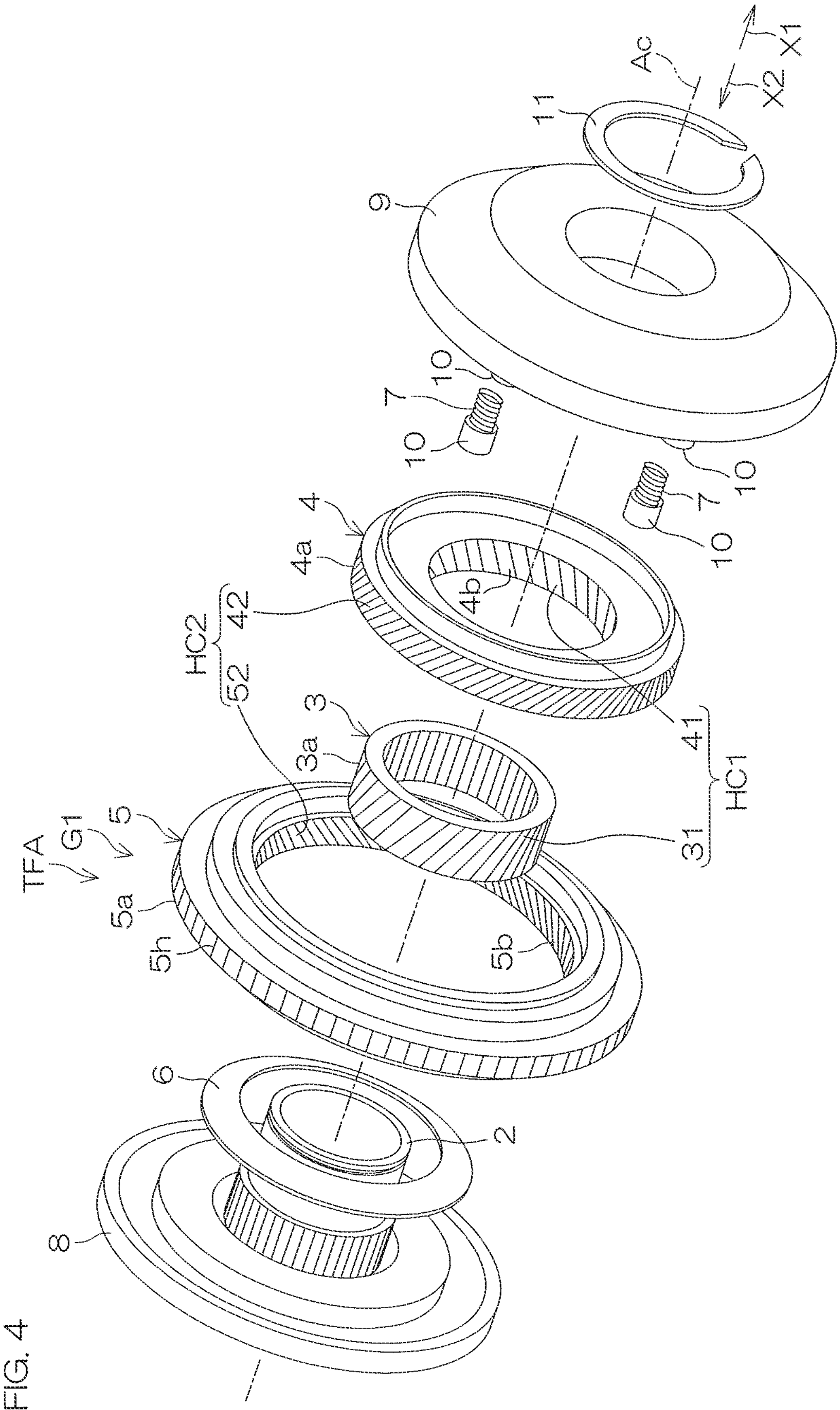
FIG. 4 is a schematic exploded perspective view of the torque fluctuation absorber.
Figure 5:
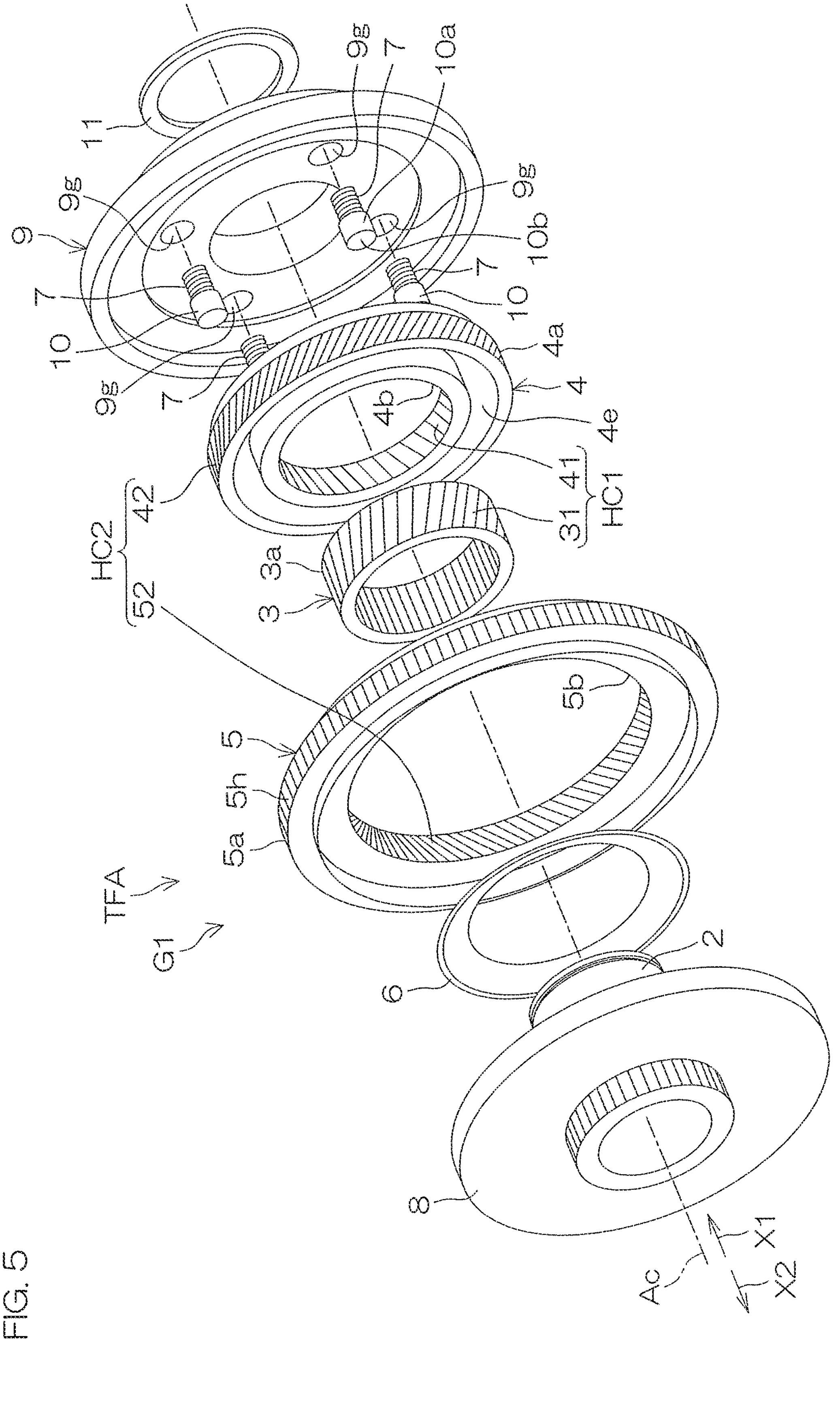
FIG. 5 is a schematic exploded perspective view of the torque fluctuation absorber when viewed at a different angle.

FIG. 4 and FIG. 5 are each an exploded perspective view of a preferred example of the torque fluctuation absorber TFA provided in the driving gear G1 when viewed at angles different from each other. As shown in FIG. 4, the torque fluctuation absorber TFA includes a base 2, an inner member 3, an intermediate member 4, an outer member 5, a first spring 6, a second spring 7, a first supporting member 8, a second supporting member 9, a spring guide 10, and a retaining ring 11. In the present preferred embodiment, the base 2 and the first supporting member 8 are integral and defined as a single member. The torque fluctuation absorber TFA further includes a first outer helical spline 31, a first inner helical spline 41, a second outer helical spline 42, and a second inner helical spline 52.

The first outer helical spline 31 is provided on an outer circumference 3*a* of the inner member 3. The first inner helical spline 41 is provided on an inner circumference 4*b* of the intermediate member 4. The first outer helical spline 31 and the first inner helical spline 41 are engaged with each other to provide a first helical spline coupling HC1. The second outer helical spline 42 is provided on an outer circumference 4*a* of the intermediate member 4. The second inner helical spline 52 is provided on an inner circumference 5*b* of the outer member 5. The second outer helical spline 42 and the second inner helical spline 52 are engaged with each other to provide a second helical spline coupling HC2.

As shown in FIG. 5, one example of the first spring 6 is a disc spring. The disc spring may be used solely or a plurality of them may be used by being stacked. An annular housing recessed portion 4*e* to house the first spring 6 is provided in the intermediate member 4. A preferred example of the second spring 7 includes a helical compression spring. Where the second spring 7 includes a helical compression spring, a plurality of the second springs 7 are provided and located at equal or substantially equal intervals in the circumferential direction around the crank axis Ac. A housing recessed portion 9*g* to house a corresponding second spring 7 is provided in the second supporting member 9. The spring guide 10 includes a tubular portion 10*a* which houses and surrounds one end of the second spring 7 and a bottom portion 10*b* which closes one end of the tubular portion 10*a* and receives one end of the second spring 7. The first spring 6 and the second spring 7 have a different spring constant from each other. The spring constant of the first spring 6 is larger than that of the second spring 7.

Figure 6A:
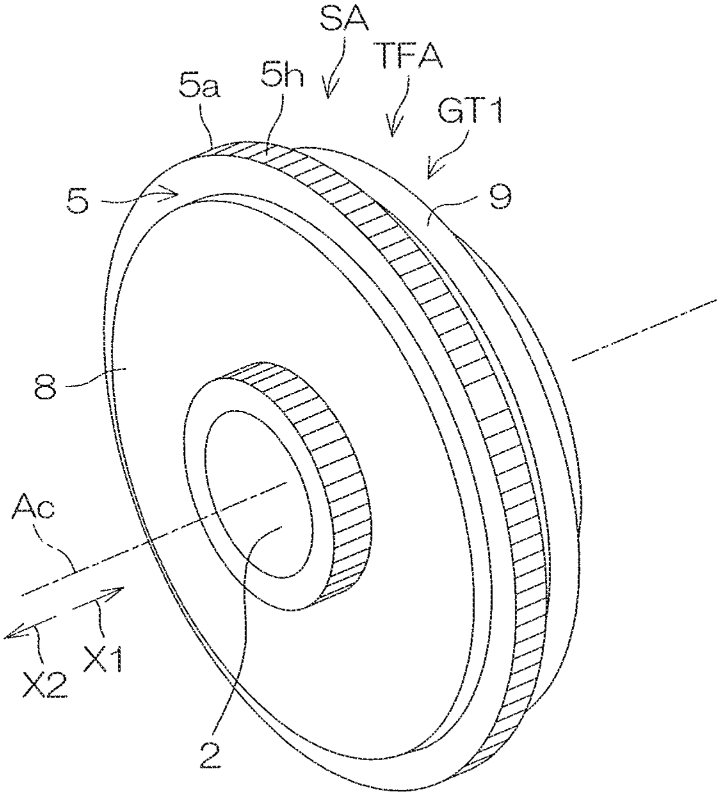
FIG. 6A and FIG. 6B are each a schematic perspective view of the torque fluctuation absorber when viewed at angles different from each other.
Figure 6B:
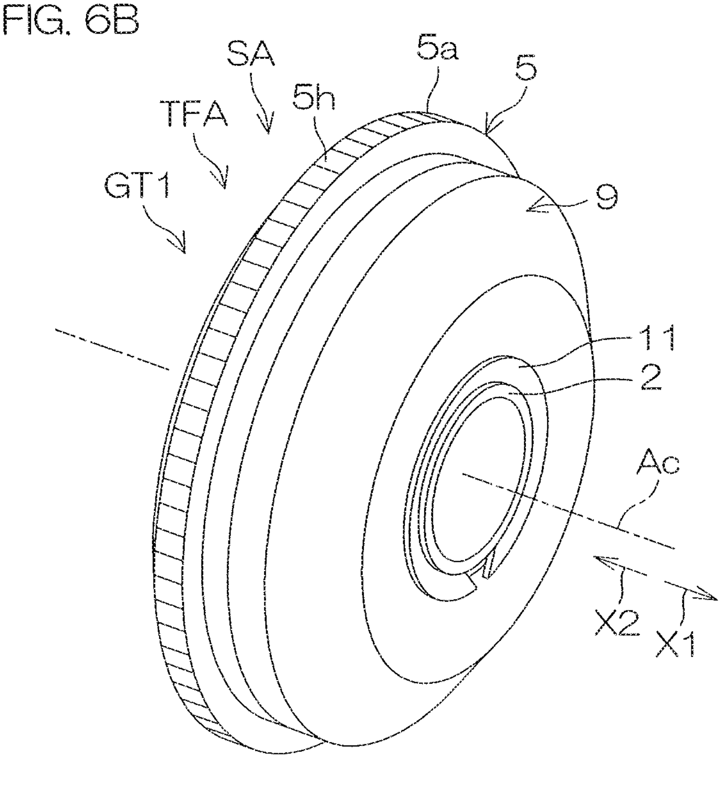

FIG. 6A and FIG. 6B are each a schematic perspective view of the torque fluctuation absorber TFA, when viewed at angles different from each other. As shown in FIG. 6A, a plurality of elements which define the torque fluctuation absorber TFA are assembled together at a stage before being installed on the crank shaft 1, thus defining a sub-assembly SA. Further, as shown in FIG. 6B, the second supporting member 9 is held by being fitted onto an outer circumference of the base 2. The retaining ring 11 is installed on the base 2 and arranged so that the second supporting member 9 will not come off the base 2 in the first axial direction X1. The retaining ring 11 is a preferred example of a regulating member to regulate an axial movement of the second supporting member 9.

Figure 7:
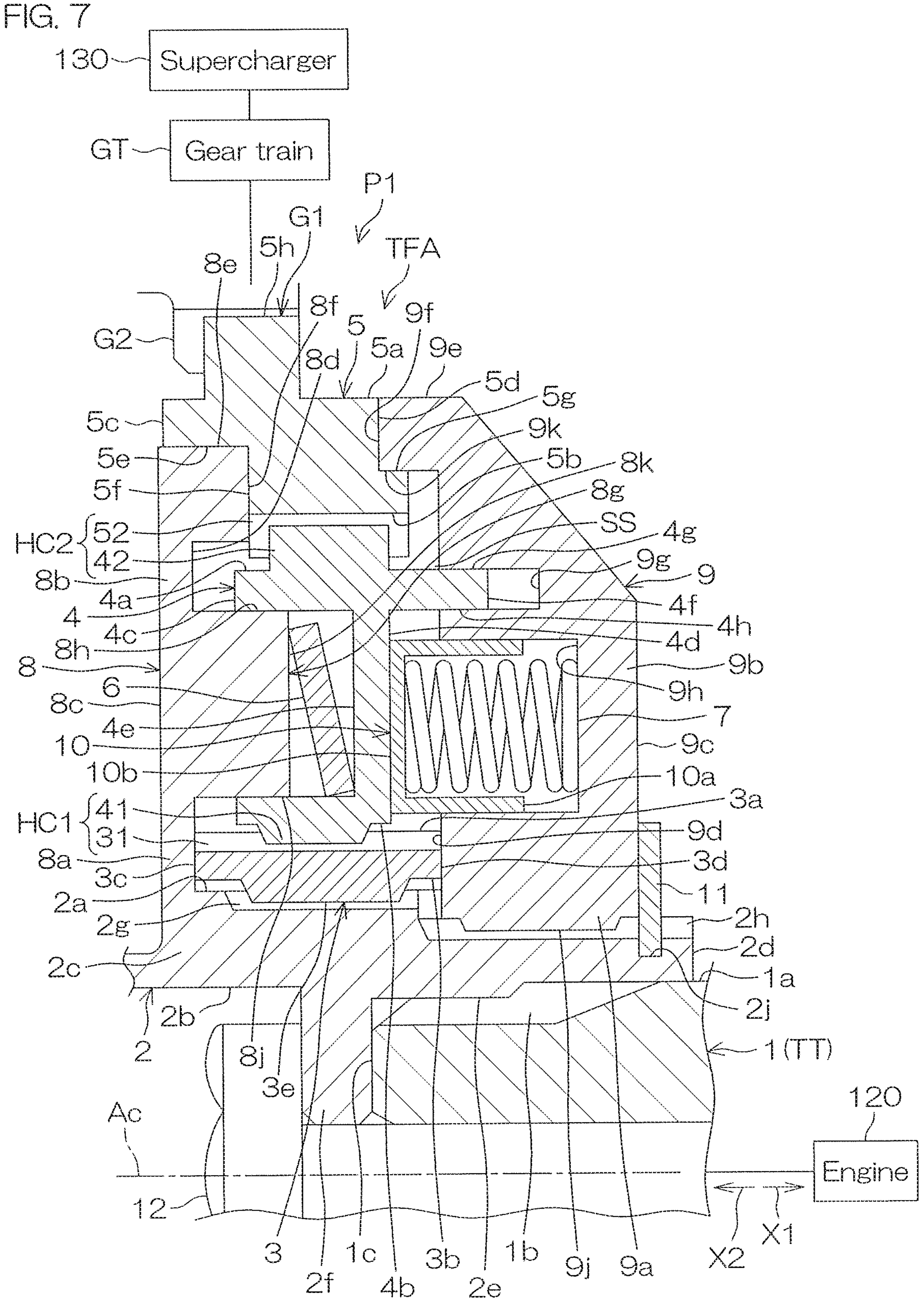
FIG. 7 is an enlarged cross-sectional view which shows major components of the torque fluctuation absorber.

FIG. 7 is an enlarged cross-sectional view which shows major components of the torque fluctuation absorber TFA provided in the driving gear G1. As shown in FIG. 7, the base 2 is ring-shaped and coaxially surrounds the crank shaft 1 (torque transmission shaft TT). The base 2 is fixed to the crank shaft 1. The base 2 is regulated in axial movement with respect to the crank shaft 1. The base 2 includes an outer circumference 2*a*, an inner circumference 2*b*, one end 2*c* and the other end 2*d* in an axial direction, an inner peripheral spline 2*e*, an inner circumference flange 2*f*, a first outer peripheral spline 2*g*, a second outer peripheral spline 2*h*, and an outer circumference groove 2*j*. The inner peripheral spline 2*e*, the first outer peripheral spline 2*g*, and the second outer peripheral spline 2*h* are all straight splines.

The inner peripheral spline 2*e* is provided on the inner circumference 2*b*. The base 2 is fitted onto an outer circumference 1*a* of the crank shaft 1. The base 2 is spline-coupled to the crank shaft 1. The inner peripheral spline 2*e* is engaged with an outer peripheral spline 1*b* on the outer circumference 1*a* of the crank shaft 1. Thus, the base 2 is coupled to the crank shaft 1 so as to rotate integrally therewith. The inner circumference flange 2*f* is an annular flange which extends inward in a radial direction from the inner circumference 2*b*. The inner circumference flange 2*f* abuts against an end surface 1*c* of the crank shaft 1. The inner circumference flange 2*f* is fastened to the end surface 1*c* of the crank shaft 1 by a fixing screw 12, which is an example of a fastening member that penetrates through the inner circumference flange 2*f*. Thus, the base 2 is fixed to the crank shaft 1.

The base 2 is integral with the first supporting member 8 as a single member. The first supporting member 8 is an annular member which extends outward in a radial direction from the one end 2*c* of the base 2. The first outer peripheral spline 2*g*, the second outer peripheral spline 2*h*, and the outer circumference groove 2*j* are provided on the outer circumference 2*a*. The first outer peripheral spline 2*g* is located adjacent to the one end 2*c*. The second outer peripheral spline 2*h* extends from the other end 2*d* up to a position adjacent to the first outer peripheral spline 2*g*.

The second supporting member 9 is an annular member. The second supporting member 9 is fitted onto the outer circumference 2*a* of the base 2. The second supporting member 9 is spline-coupled to the second outer peripheral spline 2*h* on the outer circumference 2*a* of the base 2. Thus, the second supporting member 9 is coupled to the base 2 so as to rotate integrally therewith. An axial movement of the second supporting member 9 with respect to the base 2 is regulated by a regulating member. An axial movement of the second supporting member 9 with respect to the base 2 is regulated by the retaining ring 11, which is an example of the regulating member that is fitted onto the outer circumference groove 2*j*. Thus, the second supporting member 9 is regulated in axial movement with respect to the crank shaft 1.

The inner member 3 is a ring-shaped member which coaxially surrounds the crank shaft 1. The inner member 3 rotates integrally with the crank shaft 1. The inner member 3 coaxially surrounds the base 2. The inner member 3 includes the outer circumference 3*a*, an inner circumference 3*b*, one end 3*c*, and the other end 3*d* in an axial direction, an inner peripheral spline 3*e*, and a first outer helical spline 31. The inner peripheral spline 3*e* is a straight spline which is provided on the inner circumference 3*b*. The inner member 3 is spline-coupled to the outer circumference 3*a* of the base 2. The inner peripheral spline 3*e* of the inner member 3 is engaged with the first outer peripheral spline 2*g* of the base 2. Thus, the inner member 3 rotates integrally with the base 2.

The inner member 3 is held in an axial direction between the first supporting member 8 and the second supporting member 9. The one end 3*c* of the inner member 3 abuts against the first supporting member 8. The other end 3*d* of the inner member 3 abuts against the second supporting member 9. Thus, the inner member 3 is regulated in axial movement with respect to the base 2. The inner member 3 is held on the outer circumference 2*a* of the base 2 so as to rotate integrally therewith in a state of being regulated in axial movement. The inner member 3 is regulated in axial movement with respect to the crank shaft 1. The first outer helical spline 31 is provided on the outer circumference 3*a* of the inner member 3.

The intermediate member 4 is a ring-shaped member which coaxially surrounds the crank shaft 1. The intermediate member 4 coaxially surrounds the inner member 3. The intermediate member 4 is helical spline-coupled to the inner member 3. The intermediate member 4 includes the outer circumference 4*a*, the inner circumference 4*b*, an end surface 4*c* and an end surface 4*d* in an axial direction, the first inner helical spline 41, the second outer helical spline 42, the housing recessed portion 4*e*, and an annular raised portion 4*f*.

The first inner helical spline 41 is provided on the inner circumference 4*b* of the intermediate member 4. The first inner helical spline 41 of the intermediate member 4 is engaged with the first outer helical spline 31 of the inner member 3. The first outer helical spline 31 and the first inner helical spline 41 are engaged with each other to provide the first helical spline coupling HC1. The second outer helical spline 42 is provided on the outer circumference 4*a* of the intermediate member 4.

One end surface 4*c* faces the first supporting member 8. The housing recessed portion 4*e* is an annular recessed portion which is provided on the one end surface 4*c* and is coaxial with the ring-shaped intermediate member 4. The first spring 6 is housed in the housing recessed portion 4*e*. The annular raised portion 4*f* protrudes from the other end surface 4*d* in the first axial direction X1. The annular raised portion 4*f* is coaxial with the ring-shaped intermediate member 4. The annular raised portion 4*f* is coaxial with the crank shaft 1. The annular raised portion 4*f* includes an outer peripheral surface 4*g* and an inner peripheral surface 4*h* which are coaxial with the crank shaft 1.

The outer member 5 is a ring-shaped member which coaxially surrounds the crank shaft 1. The outer member 5 is regulated in axial movement with respect to the crank shaft 1. The outer member 5 coaxially surrounds the intermediate member 4. The outer member 5 is helical spline-coupled to the intermediate member 4. The outer member 5 includes an outer circumference 5*a*, the inner circumference 5*b*, an end surface 5*c* and an end surface 5*d* in an axial direction, an inner peripheral recessed portion 5*e*, an annular step portion 5*f*, an outer peripheral recessed portion 5*g*, a plurality of teeth 5*h*, and a second inner helical spline 52. The plurality of teeth 5*h* are provided on the outer circumference 5*a* of the outer member 5.

The plurality of teeth 5*h* mesh with the first intermediate gear G2. The second inner helical spline 52 is provided on the inner circumference 5*b* of the outer member 5. The second inner helical spline 52 of the outer member 5 is engaged with the second outer helical spline 42 of the intermediate member 4. The second helical spline coupling HC2 is provided by the second inner helical spline 52 of the outer member 5 and the second outer helical spline 42 of the intermediate member 4.

One end surface 5*c* is adjacent to the first supporting member 8. The other end surface 5*d* faces the second supporting member 9. The inner peripheral recessed portion 5*e* is provided on the inner circumference 5*b* and opens to the one end surface 5*c*. The inner peripheral recessed portion 5*e* is coaxial with respect to the ring-shaped outer member 5. The inner peripheral recessed portion 5*e* is a cylindrical surface which is coaxial with the crank shaft 1. The inner peripheral recessed portion 5*e* is an example of a supported portion which is supported by the first supporting member 8. The annular step portion 5*f* is a step portion perpendicular or substantially perpendicular to the inner peripheral recessed portion 5*e* and parallel or substantially parallel to the one end surface 5*c*. The annular step portion 5*f* as an example of a held-between portion. The annular step portion 5*f* is a surface which is perpendicular or substantially perpendicular to the crank axis Ac.

The outer peripheral recessed portion 5*g* is provided on the outer circumference 5*a* and opens to the other end surface 5*d*. The other end surface 5*d* is a preferred example of the held-between portion. The outer peripheral recessed portion 5*g* is coaxial with respect to the ring-shaped outer member 5. The outer peripheral recessed portion 5*g* is a cylindrical surface which is coaxial with the crank axis Ac. The outer peripheral recessed portion 5*g* is an example of a supported portion which is supported by the second supporting member 9.

The first supporting member 8 is a ring-shaped member which is coaxial with the crank shaft 1. The first supporting member 8 includes an annular linkage portion 8*a*, an annular extension portion 8*b*, an end surface 8*c* and an end surface 8*d* in an axial direction, an outer peripheral surface 8*e*, an annular raised portion 8*f*, and an annular raised portion 8*g*. The annular linkage portion 8*a* of the first supporting member 8 is linked integrally with the one end 2*c* of the base 2. The annular extension portion 8*b* extends outward in a radial direction from the annular linkage portion 8*a*. One end surface 8*c* defines a portion of an outer surface of the driving gear G1. The outer peripheral surface 8*e* of the first supporting member 8 is equivalent to an outer peripheral surface of the extension portion 8*b*. The outer peripheral surface 8*e* is a cylindrical surface which is coaxial with the crank shaft 1. The outer peripheral surface 8*e* is fitted into the inner peripheral recessed portion 5*e* of the outer member 5. Thus, the extension portion 8*b* of the first supporting member 8 has a function of supporting the outer member 5 so as to rotate coaxially with the crank shaft 1.

The annular raised portion 8*f* is provided on the other end surface 8*d* so as to be adjacent to the outer peripheral surface 8*e*. The annular raised portion 8*f* is in contact with the annular step portion 5*f* of the outer member 5 so as to slide thereon. The annular raised portion 8*f* has a function of regulating an axial movement of the outer member 5. Thus, the extension portion 8*b* of the first supporting member 8 has the function of regulating an axial movement of the outer member 5.

The annular raised portion 8*g* is located farther inward in a radial direction than the annular raised portion 8*f* in the extension portion 8*b*. The annular raised portion 8*g* protrudes from the other end surface 8*d*. The annular raised portion 8*g* is coaxial with the ring-shaped first supporting member 8. The annular raised portion 8*g* is coaxial with the crank shaft 1. The annular raised portion 8*g* includes an outer circumference 8*h*, an inner circumference 8*j*, and a top portion 8*k* that is an example of a receiving portion. The outer circumference 8*h* and the inner circumference 8*j* of the annular raised portion 8*g* define a cylindrical surface which is coaxial with the crank shaft 1. The annular raised portion 8*g* is fitted into the housing recessed portion 4*e* of the one end surface 5*c* of the intermediate member 4. Thus, the first supporting member 8 has a function of supporting the intermediate member 4 so as to rotate coaxially with the crank shaft 1. The extension portion 8*b* of the first supporting member 8 also has a function of supporting the intermediate member 4 so as to move in an axial direction.

The first spring 6 is interposed between the extension portion 8*b* of the first supporting member 8 and the intermediate member 4. The first spring 6 is flexed between the extension portion 8*b* of the first supporting member 8 and the intermediate member 4. The first spring 6 biases the intermediate member 4 in the first axial direction X1. The first spring 6 is interposed between the top portion 8*k* of the annular raised portion 8*g* provided in the extension portion 8*b* of the first supporting member 8 and the bottom of the housing recessed portion 4*e* of the intermediate member 4. The first spring 6 biases the intermediate member 4 in the first axial direction X1.

The second supporting member 9 is a ring-shaped member which is coaxial with the crank shaft 1. The second supporting member 9 includes an annular linkage portion 9*a*, an annular extension portion 9*b*, an end surface 9*c* and an end surface 9*d* in an axial direction, an outer circumference 9*e*, an annular raised portion 9*f*, the housing recessed portion 9*g*, and an annular recessed portion 9*h*. The annular linkage portion 9*a* of the second supporting member 9 is linked integrally with the other end 2*d* of the base 2. The annular linkage portion 9*a* of the second supporting member 9 is spline-coupled to the outer circumference 2*a* of the base 2. An inner peripheral spline 9*j* which is a straight spline provided in the linkage portion 9*a* is engaged with the second outer peripheral spline 2*h* on the outer circumference 2*a* of the base 2. The second supporting member 9 rotates integrally with the base 2. The annular extension portion 8*b* extends outward in a radial direction from the annular linkage portion 8*a*. The outer circumference 9*e* of the second supporting member 9 is equivalent to an outer circumference of the extension portion 9*b*. One end surface 9*c* is also an outer surface of the driving gear G1.

The annular raised portion 9*f* protrudes from the other end surface 9*d* in the extension portion 9*b*. The annular raised portion 9*f* is located adjacent to the outer circumference 9*e*. An inner peripheral surface 9*k* of the annular raised portion 9*f* is a cylindrical surface coaxial with the crank shaft 1. The inner peripheral surface 9*k* of the annular raised portion 9*f* is fitted into the outer peripheral recessed portion 5*g* of the outer member 5 so as to slide thereon. Thus, the extension portion 9*b* of the second supporting member 9 provides the function of supporting the outer member 5 so as to rotate coaxially with the crank shaft 1. The annular raised portion 9*f* is in contact with the other end surface 5*d* of the outer member 5 so as to slide thereon. Thus, the extension portion 9*b* of the second supporting member 9 provides the function of regulating an axial movement of the outer member 5.

The housing recessed portion 9*g* and the annular recessed portion 9*h* are provided on the other end surface 9*d* in the extension portion 9*b*. The housing recessed portion 9*g* is located farther outward in a radial direction than the annular recessed portion 9*h*. The housing recessed portion 9*g* is coaxial with the ring-shaped second supporting member 9. The housing recessed portion 9*g* is coaxial with the crank shaft 1. The annular raised portion 4*f* of the intermediate member 4 is fitted into the housing recessed portion 9*g* so as to slide thereon. Thus, the extension portion 9*b* of the second supporting member 9 has the function of supporting the intermediate member 4 so as to rotate coaxially with the crank shaft 1. The extension portion 9*b* of the second supporting member 9 also has the function of supporting the intermediate member 4 so as to move in an axial direction.

The housing recessed portion 9*g* houses the second spring 7. The second spring 7 is interposed between the extension portion 9*b* of the second supporting member 9 and the intermediate member 4. The second spring 7 is flexed between the extension portion 9*b* of the second supporting member 9 and the intermediate member 4. The second spring 7 biases the intermediate member 4 in the second axial direction X2. A preferred example of the second spring 7 is a helical compression spring. The second spring 7 is interposed between the bottom of the annular recessed portion 9*h* provided in the extension portion 9*b* of the second supporting member 9 and the other end surface 4*d* of the intermediate member 4. The bottom portion 10*b* of the spring guide 10 is interposed between the other end surface 4*d* of the intermediate member 4 and the second spring 7. The bottom portion 10*b* is slidable with respect to the other end surface 4*d*.

Due to being surrounded by the base 2, the outer member 5, the first supporting member 8, and the second supporting member 9, a housing space SS is provided in which the inner member 3, the intermediate member 4, the first spring 6, and the second spring 7 are housed.

Figure 8A:
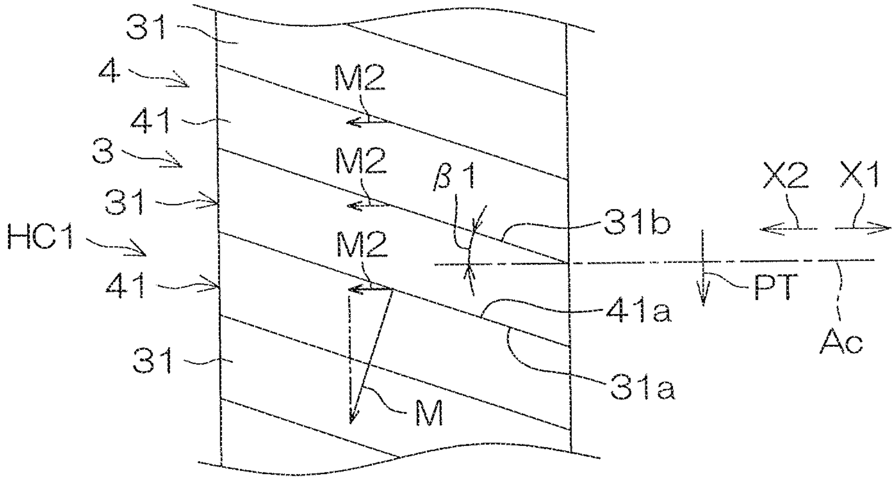
FIG. 8A and FIG. 8B are each an explanatory view for describing functions of a first helical spline coupling.
Figure 8B:
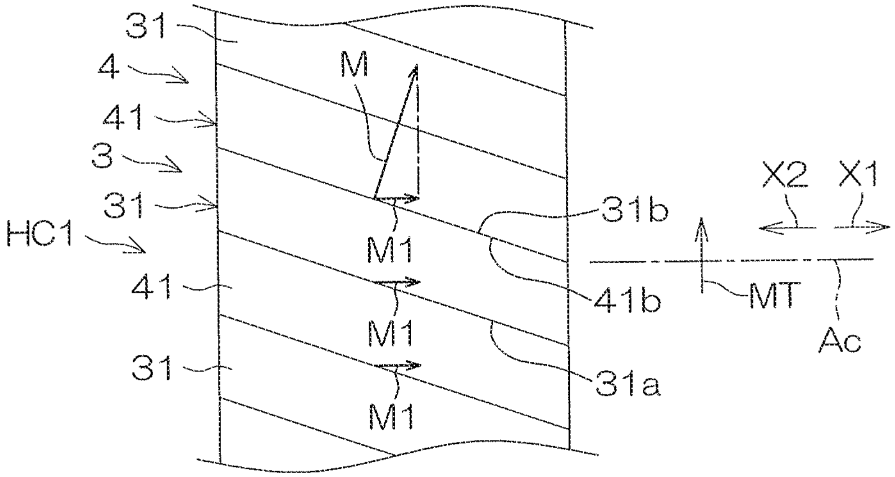

FIG. 8A and FIG. 8B are each an explanatory view for describing functions of the first helical spline coupling HC1. FIG. 8A shows a case in which a positive torque PT is transmitted from the crank shaft 1 to the supercharger 130 through the gear train GT. In this case, an axial component M2 of an engaging force M imparted from a tooth surface 31*a* of the first outer helical spline 31 to a corresponding tooth surface 41*a* of the first inner helical spline 41 is directed in the second axial direction X2. Therefore, the intermediate member 4 is moved in the second axial direction X2 which is a direction in which the first spring 6 is compressed (refer to FIG. 10). As shown in FIG. 8A, the first inner helical spline 41 is inclined with respect to the crank axis Ac (equivalent to the central axis of the intermediate member 4) so that the intermediate member 4 is able to be moved in the second axial direction X2 when the positive torque PT is transmitted from the crank shaft 1. The first inner helical spline 41 has a torsion angle $\beta$1.

Figure 11:
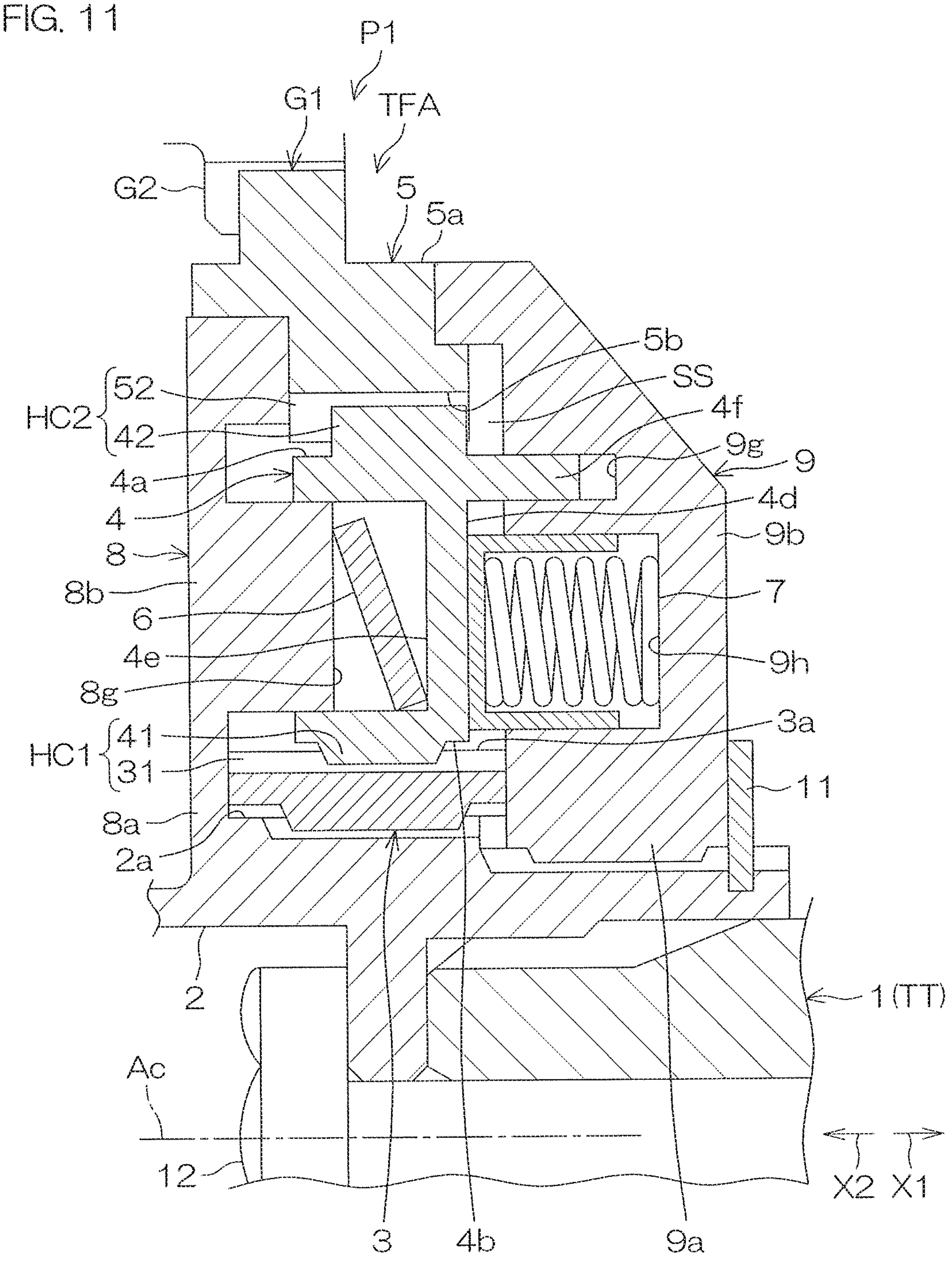
FIG. 11 is a cross-sectional view which shows another operational condition of the torque fluctuation absorber.

FIG. 8B shows a case in which a negative torque MT is transmitted from the crank shaft 1 to the supercharger 130 through the gear train GT. In this case, an axial component M1 of an engaging force M which is imparted from a tooth surface 31*b* of the first outer helical spline 31 to a corresponding tooth surface 41*b* of the first inner helical spline 41 is directed in the first axial direction X1. Therefore, the intermediate member 4 is moved in the first axial direction X1 which is a direction in which the second spring 7 is compressed (refer to FIG. 11).

Figure 9A:
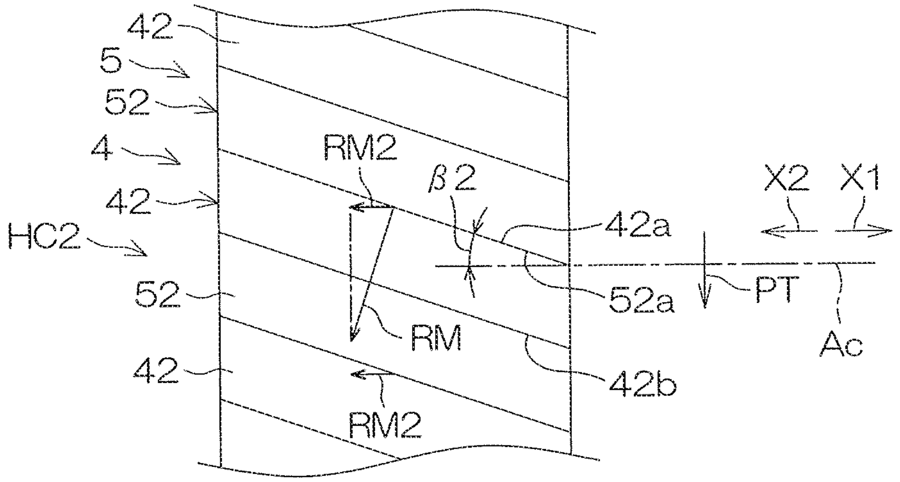
FIG. 9A and FIG. 9B are each an explanatory view for describing functions of a second helical spline coupling.
Figure 9B:
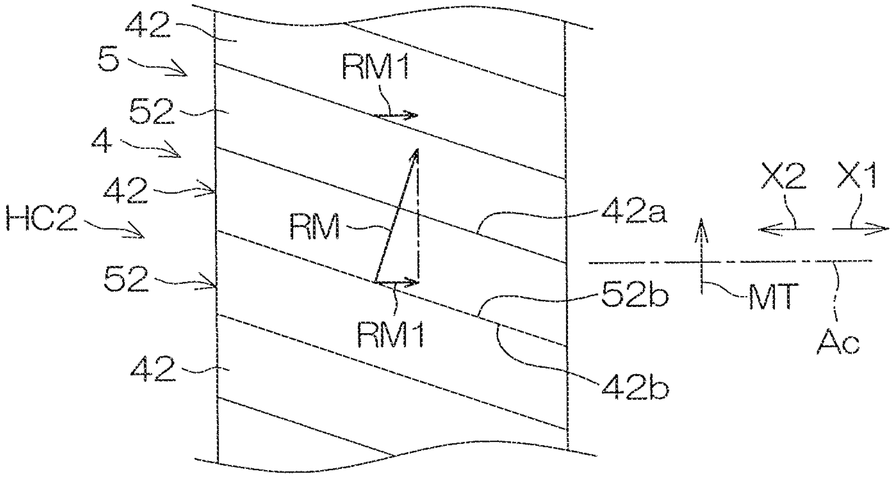

FIG. 9A and FIG. 9B are each an explanatory view for describing functions of the second helical spline coupling HC2. FIG. 9A shows a case in which the positive torque PT is transmitted from the crank shaft 1 to the supercharger 130 through the gear train GT. In this case, an axial component RM2 of an engaging reaction force RM which is imparted from a corresponding tooth surface 52*a* of the second inner helical spline 52 to a tooth surface 42*a* of the second outer helical spline 42 is directed in the second axial direction X2. Therefore, the intermediate member 4 is moved in the second axial direction X2 which is a direction in which the first spring 6 is compressed (refer to FIG. 10). As shown in FIG. 9A, the second outer helical spline 42 is inclined with respect to the crank axis Ac (equivalent to the central axis of the intermediate member 4) so that the intermediate member 4 is moved in the second axial direction X2 when the positive torque PT is transmitted from the crank shaft 1. The second outer helical spline 42 has a torsion angle β2. In the present preferred embodiment, the first inner helical spline 41 and the second outer helical spline 42 are inclined in the same direction with respect to the crank axis Ac (equivalent to the central axis of the intermediate member 4). However, the first inner helical spline 41 and the second outer helical spline 42 may be inclined in mutually opposite directions with respect to the crank axis Ac (equivalent to the central axis of the intermediate member 4).

Here, in order that the intermediate member 4 is able to be moved axially, there is provided a relationship shown by the following formula between the torsion angle β1 of the first inner helical spline 41 and the torsion angle β2 of the second outer helical spline 42. However, a pitch circle diameter of the first inner helical spline 41 is given as D1, and a pitch circle diameter of the second outer helical spline 42 is given as D2.

$$\pi \times D1/\tan\beta1 = \pi \times D2/\tan\beta2$$

FIG. 9B shows a case in which a negative torque MT is transmitted from the crank shaft 1 to the supercharger 130 through the gear train GT. In this case, an axial component RM1 of an engaging reaction force RM which is imparted from a corresponding tooth surface 52*b* of the second inner helical spline 52 to a tooth surface 42*b* of the second outer helical spline 42 is directed in the first axial direction X1. Therefore, the intermediate member 4 is moved in the first axial direction X1 which is a direction in which the second spring 7 is compressed (refer to FIG. 11).

According to the present preferred embodiment, in the torque fluctuation absorber TFA and also in the vessel propulsion apparatus P1 including the torque fluctuation absorber TFA, the following effects are obtained. That is, as shown in FIG. 7, the torque fluctuation absorber TFA includes a first outer helical spline 31, an intermediate member 4, an outer member 5, a first spring 6, and a second spring 7. The first outer helical spline 31 rotates integrally with a torque transmission shaft TT. The intermediate member 4 is ring-shaped, coaxially surrounds the torque transmission shaft TT, and is able to move in a first axial direction X1 and in a second axial direction X2 which is an opposite direction to the first axial direction X1. The intermediate member 4 includes on an inner circumference 4*b* thereof a first inner helical spline 41 which is engaged with the first outer helical spline 31 to provide a first helical spline coupling HC1 and includes on an outer circumference 4*a* thereof a second outer helical spline 42. The outer member 5 is ring-shaped, coaxially surrounds the torque transmission shaft TT, and is regulated in axial movement with respect to the torque transmission shaft TT. The outer member 5 includes on an outer circumference 5*a* thereof a tooth which meshes with a corresponding gear of a gear train GT. The outer member 5 includes on an inner circumference 5*b* thereof a second inner helical spline 52 which is engaged with the second outer helical spline 42 to provide a second helical spline coupling HC2. The first spring 6 biases the intermediate member 4 in the first axial direction X1. The second spring 7 biases the intermediate member 4 in the second axial direction X2.

According to this structural arrangement, the intermediate member 4 coaxially surrounds the crank shaft 1 which is an example of the torque transmission shaft TT. The intermediate member 4 is able to move in the first axial direction X1 and in the second axial direction X2. The intermediate member 4 is linked with the crank shaft 1 through the first helical spline coupling HC1 and linked with the outer member 5 through the second helical spline coupling HC2. When a torque fluctuation occurs in a torque transmission path, due to actions of the first helical spline coupling HC1 and the second helical spline coupling HC2, the intermediate member 4 is moved in the second axial direction X2 in resistance to the first spring 6. It is also moved in the first axial direction X1 in resistance to the second spring 7. Therefore, it is possible to absorb a bidirectional torque fluctuation.

The torque fluctuation absorber TFA further includes a ring-shaped inner member 3 which coaxially surrounds a crank shaft 1 (torque transmission shaft TT). The inner member 3 is regulated in axial movement with respect to the crank shaft 1 and also rotates integrally with the crank shaft 1. The first outer helical spline 31 provides the first helical spline coupling HC1 provided on an outer circumference 3*a* of the inner member 3. The torque fluctuation absorber TFA may have a higher versatility by using the inner member 3.

The torque fluctuation absorber TFA also includes a ring-shaped base 2 which coaxially surrounds the crank shaft 1 (torque transmission shaft TT) and is fixed to the crank shaft 1. On an outer circumference 2*a* of the base 2, the inner member 3 is held so as to rotate integrally in a state of being regulated in axial movement. The torque fluctuation absorber TFA further includes a first supporting member 8 and a second supporting member 9. The first supporting member 8 includes an annular linkage portion 8*a* which is linked with the base 2 in a state of being regulated in axial movement with respect to the base 2 and an annular extension portion 8*b* which extends outward in a radial direction from the linkage portion 8*a*. The second supporting member 9 includes an annular linkage portion 9*a* which is linked with the base 2 in a state of being regulated in axial movement with respect to the base 2 and an annular extension portion 9*b* which extends outward in a radial direction from the linkage portion 9*a*. The first supporting member 8 and the second supporting member 9 regulate an axial movement of the outer member 5 between their respective extension portions 8*b*, 9*b*. The first spring 6 is interposed between the extension portion 8*b* of the first supporting member 8 and the intermediate member 4. The second spring 7 is interposed between the extension portion 9*b* of the second supporting member 9 and the intermediate member 4.

According to this structural arrangement, the inner member 3 rotates integrally with respect to the base 2 fixed to the crank shaft 1 and also regulated in axial movement. The linkage portion 8*a* of the first supporting member 8 and the linkage portion 9*a* of the second supporting member 9 are linked with the base 2 and also regulated in axial movement with respect to the base 2. Therefore, the first supporting member 8 and the second supporting member 9 are regulated in axial movement with respect to the base 2. The outer member 5 is regulated in axial movement between the extension portion 8b of the first supporting member 8 and the extension portion 9b of the second supporting member 9. When a torque fluctuation occurs in the torque transmission path, due to actions of the first helical spline coupling HC1 and the second helical spline coupling HC2, the intermediate member 4 interposed between the outer member 5 and the inner member 3 is moved in the first axial direction X1 or in the second axial direction X2. When the intermediate member 4 is moved in the second axial direction X2, the first spring 6 is compressed between the extension portion 8b of the first supporting member 8 and the intermediate member 4. When the intermediate member 4 is moved in the first axial direction X1, the second spring 7 is compressed between the extension portion 9b of the second supporting member 9 and the intermediate member 4. Therefore, it is possible to absorb a bidirectional torque fluctuation.

Further, the outer member 5 is supported so as to rotate coaxially with the crank shaft 1 by the extension portion 8b of the first supporting member 8 and the extension portion 9b of the second supporting member 9. Although not shown, the outer member 5 may be supported so as to rotate coaxially with the crank shaft 1 by only one of the extension portion 8b of the first supporting member 8 and the extension portion 9b of the second supporting member 9.

Further, the extension portion 8b of the first supporting member 8 supports an inner circumference 5b of the outer member 5 so as to rotate coaxially with the crank shaft 1. The extension portion 9b of the second supporting member 9 supports an outer circumference 5a of the outer member 5 so as to rotate coaxially with the crank shaft 1. According to this structural arrangement, it is possible to support each of the outer circumference 5a and the inner circumference 5b of the outer member 5 so as to rotate by the extension portion 8b, 9b of a corresponding supporting member 8, 9. Although not shown, the extension portion 8b of the first supporting member 8 may support the outer circumference 5a of the outer member 5 so as to rotate coaxially with the crank shaft 1, and the extension portion 9b of the second supporting member 9 may support the inner circumference 5b of the outer member 5 so as to rotate coaxially with the crank shaft 1.

It is also possible to support the intermediate member 4 so as to rotate coaxially with the crank shaft 1 (torque transmission shaft TT) by the extension portion 8b of the first supporting member 8 and the extension portion 9b of the second supporting member 9. Although not shown, the intermediate member 4 may be supported so as to rotate coaxially with the crank shaft 1 (torque transmission shaft TT) by only one of the extension portion 8b of the first supporting member 8 and the extension portion 9b of the second supporting member 9.

Further, one of the first supporting member 8 and the second supporting member 9 (the first supporting member 8 in the present preferred embodiment) is integral with the base 2 as a single member. The other of the first supporting member 8 and the second supporting member 9 (the second supporting member 9 in the present preferred embodiment) is fitted onto the outer circumference 2a of the base 2 and supported in a state of being regulated in axial movement with respect to the base 2. According to this structural arrangement, one of the first supporting member 8 and the second supporting member 9 is integral with the base 2 as a single member. It is, therefore, possible to make the structure simple. The second supporting member 9 may be integral with the base 2 as a single member, and the first supporting member 8 may be fitted onto the outer circumference 2a of the base 2 and supported in a state of being regulated in axial movement with respect to the base 2.

Further, due to being surrounded by the base 2, the outer member 5, the first supporting member 8, and the second supporting member 9, a housing space SS is provided in which the inner member 3, the intermediate member 4, the first spring 6, and the second spring 7 are housed. According to this structural arrangement, it is possible to house the inner member 3, the intermediate member 4, the first spring 6, and the second spring 7 in the housing space SS which is defined by the base 2, the outer member 5, the first supporting member 8, and the second supporting member 9.

Further, a sub-assembly SA (refer to FIG. 6A) is provided which includes the base 2, the inner member 3, the intermediate member 4, the outer member 5, the first spring 6, and the second spring 7. According to this structural arrangement, the sub-assembly SA is able to be assembled in advance. The sub-assembly SA is able to be incorporated in the crank shaft 1 (torque transmission shaft TT). It is, therefore, possible to improve ease of assembly.

Further, the first spring 6 and the second spring 7 have a different spring constant from each other. According to this structural arrangement, depending on a direction in which the intermediate member 4 moves upon occurrence of a torque fluctuation, a spring load to resist the movement of the intermediate member 4 is different.

Further, the first spring 6 has a larger spring constant than the second spring 7. According to this structural arrangement, it is possible to increase a spring load of the first spring 6 to resist a movement of the intermediate member 4 in the second axial direction X2 than a spring load of the second spring 7 to resist a movement of the intermediate member 4 in the first axial direction X1.

Further, the first spring 6 includes a disc spring, and the second spring 7 includes a helical compression spring. According to this structural arrangement, the disc spring as the first spring 6 has a progressively increasing spring constant in relation to a flexing displacement. Therefore, a high spring load is obtained in resistance to movement of the intermediate member 4 in the second axial direction X2. It is possible to enhance the effect of absorbing a torque fluctuation.

Figure 10:
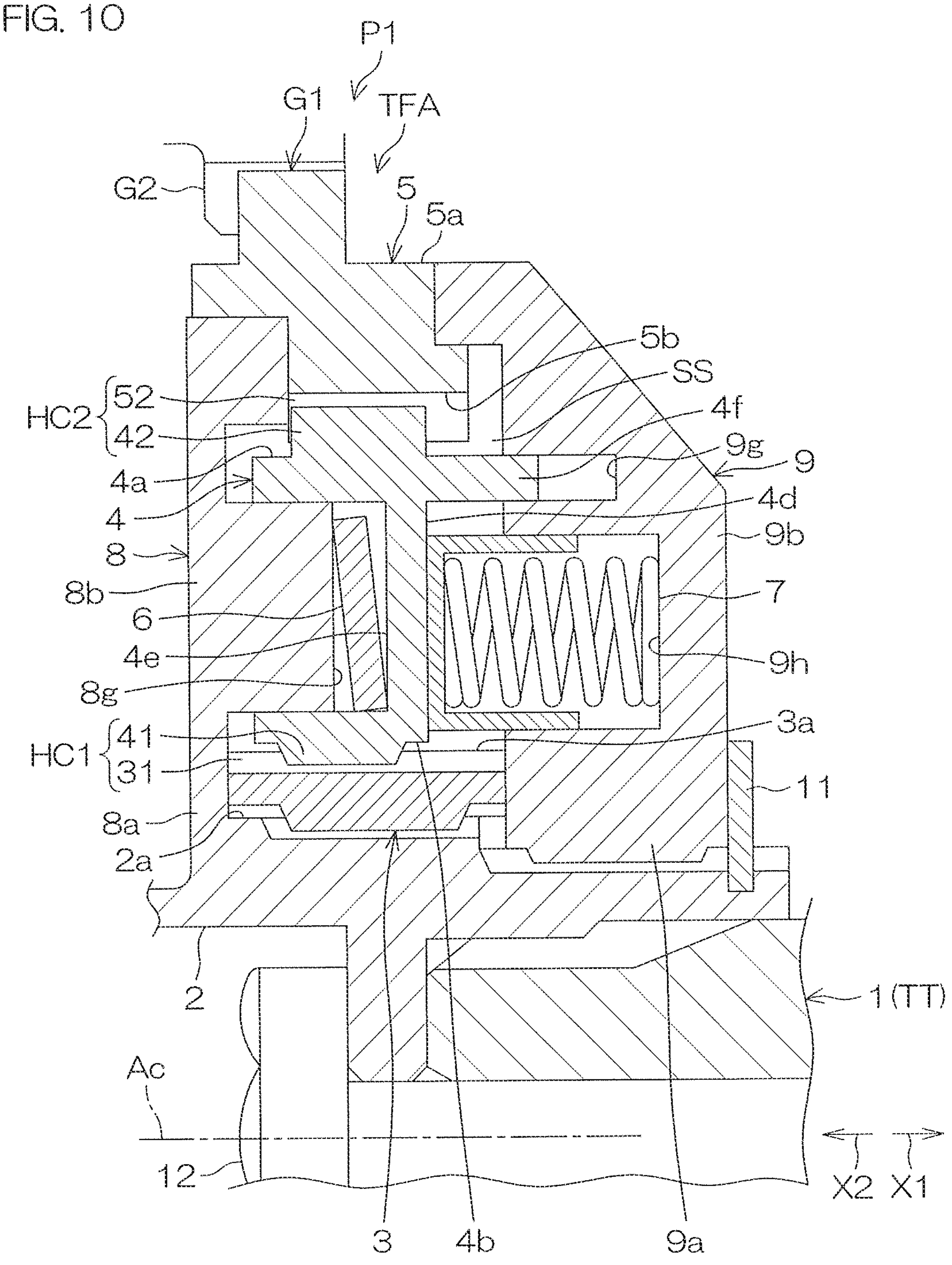
FIG. 10 is a cross-sectional view which shows one operational condition of the torque fluctuation absorber.

Further, when a positive torque PT is transmitted from the crank shaft 1 to the supercharger 130, the intermediate member 4 is moved in the second axial direction X2 which is a direction in which the first spring 6 is compressed (refer to FIG. 10). In order to realize the above, the first inner helical spline 41 (refer to FIG. 8A) and the second outer helical spline 42 (refer to FIG. 8B) are inclined with respect to the crank axis Ac (the central axis of the intermediate member 4). According to this structural arrangement, when the positive torque is transmitted from the crank shaft 1 to the supercharger 130, the intermediate member 4 is moved in the second axial direction X2 which is a direction in which the first spring 6 having a higher spring constant is compressed. Therefore, a torque fluctuation is effectively absorbed. At least one of the first inner helical spline 41 and the second outer helical spline 42 may be inclined with respect to the crank axis Ac (the central axis of the intermediate member 4).

Figure 12:
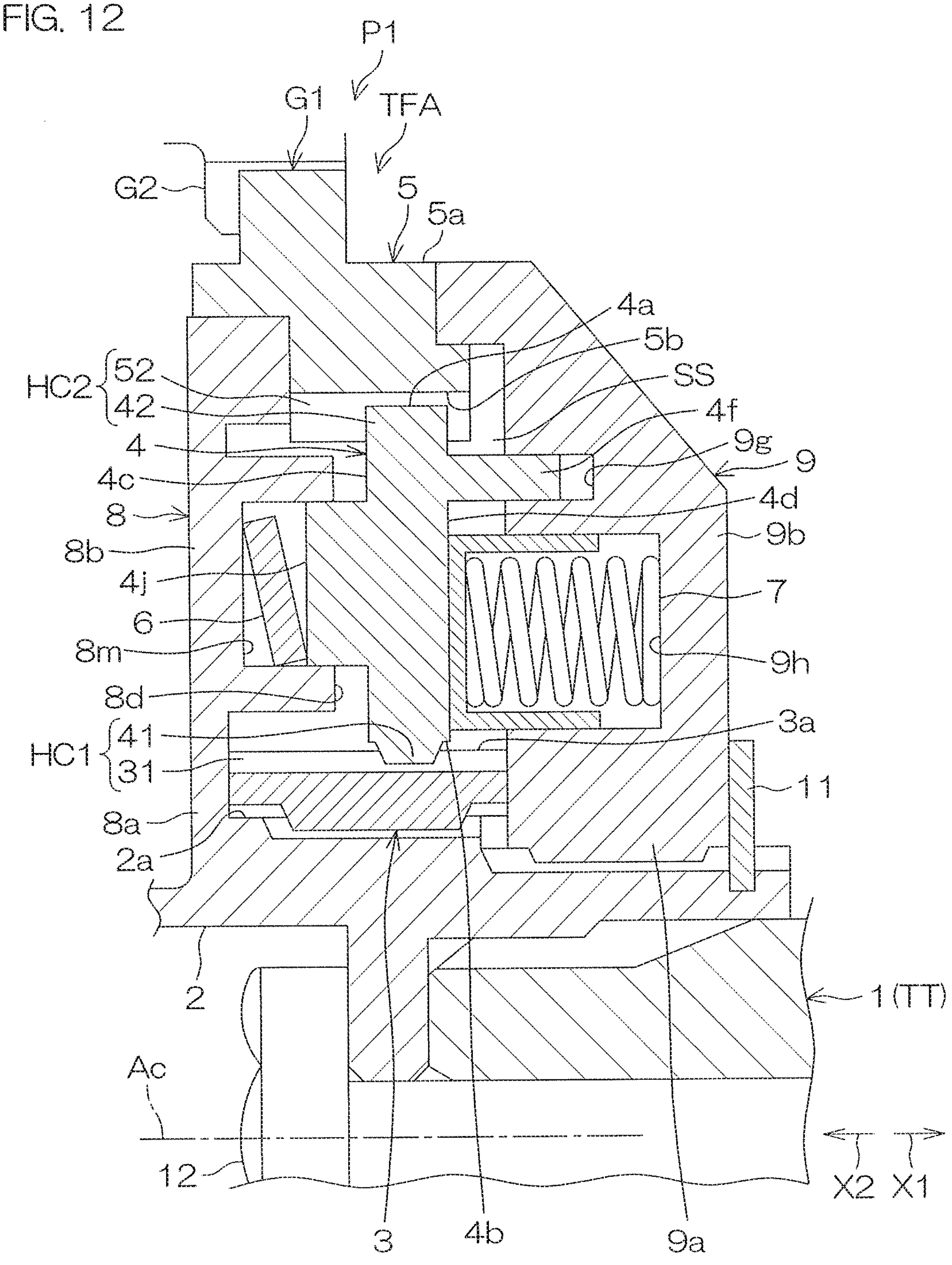
FIG. 12 is a cross-sectional view which shows a preferred modified example of the torque fluctuation absorber.

FIG. 12 shows a preferred modified example. The preferred modified example of FIG. 12 is mainly different from the preferred embodiment of FIG. 7 in the following. In the extension portion 8b of the first supporting member 8, an annular housing recessed portion 8m to house the first spring 6 is provided on the other end surface 8d. The intermediate member 4 includes on the one end surface 4c the annular raised portion 4*j* which is fitted into the annular housing recessed portion 8*m* of the first supporting member 8 so as to slide thereon. This modified example also provides the same effects as those of the preferred embodiment of FIG. 7.

Figure 13:
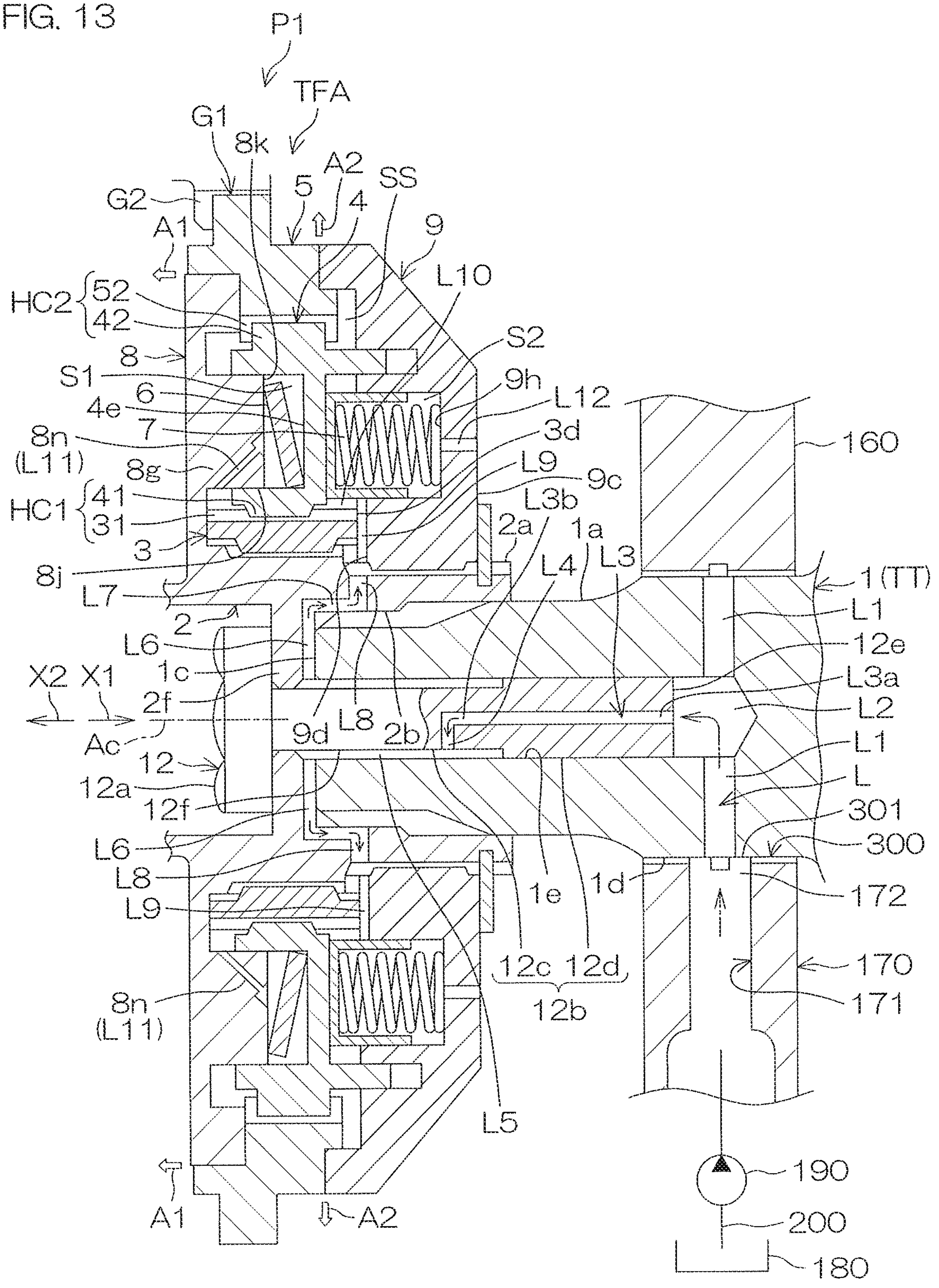
FIG. 13 is a cross-sectional view which shows another preferred modified example of the torque fluctuation absorber.

FIG. 13 is a cross-sectional view which shows another preferred modified example of the torque fluctuation absorber TFA. The torque fluctuation absorber TFA of the preferred modified example in FIG. 13 is mainly different from the torque fluctuation absorber TFA of the preferred embodiment in FIG. 7 in that the torque fluctuation absorber TFA includes the oil path L that supplies oil to the housing space SS. The engine 120 includes a cylinder body 160, a crankcase 170, an oil pan 180, an oil pump 190, and a suction pipe 200. The cylinder body 160 is located below a cylinder cover which is not shown. The crankcase 170 is located below the cylinder body 160. The oil pan 180 is schematically shown and disposed below the crankcase 170. The oil pump 190 suctions oil stored in the oil pan 180 through the suction pipe 200 and supplies it to each part of the engine 120. The crankcase 170 houses the crank shaft 1 together with the cylinder body 160. The crank shaft 1 is rotatably supported by the cylinder body 160 and the crankcase 170. A journal bearing 300 which rotatably supports a supported portion 1*d* of the crank shaft 1 is located at an abutting portion of the cylinder body 160 against the crankcase 170. The journal bearing 300 provides a bearing clearance 301 between the supported portion 1*d* of the crank shaft 1 and a bearing surface of the journal bearing 300.

The crankcase 170 includes an oil path 171 which extends in an up/down direction. One end 172 (upper end) of the oil path 171 is communicatively connected to the bearing clearance 301. The other end of the oil path 171 (not shown) is connected to the oil pump 190 through an oil path (not shown). Oil is fed under pressure and supplied from the oil pump 190 through the oil path 171 to the bearing clearance 301 of the journal bearing 300.

The crank shaft 1 includes a screw hole 1*e* and at least one oil path L1 extending in a radial direction. The fixing screw 12 is screwed into the screw hole 1*e*. An oil path L2 is provided in the screw hole 1*e* between the tip of the fixing screw 12 and the bottom of the screw hole 1*e*. The oil path L1 communicatively connects the bearing clearance 301 of the journal bearing 300 with the oil path L2 at the bottom of the screw hole 1*e*.

The fixing screw 12 is, for example, a bolt and includes a head 12*a* and a shank 12*b*. The shank 12*b* includes an under-head portion 12*c*, a screw shank 12*d*, an oil path L3 extending in an axial direction, and an oil path L4 extending in a radial direction. The under-head portion 12*c* is adjacent to the head 12*a*. The screw shank 12*d* extends from a position adjacent to the under-head portion 12*c* to a tip 12*e* of the shank 12*b*. The screw shank 12*d* is screwed and fitted into the screw hole 1*e* of the crank shaft 1. An outer circumference 12*f* of the under-head portion 12*c* is provided by a cylindrical surface which is free of threads. An outer diameter of the outer circumference 12*f* of the under-head portion 12*c* is smaller than an inner diameter of the screw hole 1*e* of the crank shaft 1. A portion of an inner circumference of the screw hole 1*e* which surrounds the under-head portion 12*c* may be defined by a cylindrical surface which is free of internal threads. A tubular oil path L5 is provided between the outer circumference 12*f* of the under-head portion 12*c* and the inner circumference of the screw hole 1*e* of the crank shaft 1.

In the fixing screw 12, the oil path L3 in an axial direction is defined by an axial direction hole which extends from the tip 12*e* of the shank 12*b* up to a midway portion of the under-head portion 12*c* in the axial direction. The oil path L3 includes one end L3*a* and the other end L3*b*. The one end L3*a* of the oil path L3 is communicatively connected with the oil path L2. The oil path L4 extending in a radial direction is defined by a radial direction hole which communicatively connects the other end L3*b* of the oil path L3 in an axial direction with the tubular oil path L5.

At least one oil path L6 extending in a radial direction is provided between the end surface 1*c* of the crank shaft 1 and the inner circumference flange 2*f* of the base 2. The oil path L6 is defined by, for example, a radial direction groove that is provided on the end surface 1*c* of the crank shaft 1. A tubular oil path L7 is provided between the inner circumference 2*b* of the base 2 and the outer circumference 1*a* in a tip portion of the crank shaft 1. The base 2 defines at least one oil path L8 which communicatively connects the tubular oil path L7 with the housing space SS. The oil path L8 is defined by a radial direction hole which penetrates through the outer circumference 2*a* and the inner circumference 2*b* of the base 2.

Oil which has been supplied from the oil pump 190 to the bearing clearance 301 of the journal bearing 300 is supplied to the oil path L1 of the crank shaft 1. The oil which has been supplied to the oil path L1 is supplied to the housing space SS through the oil path L2, the oil path L3, the oil path L4, the oil path L5, the oil path L6, the oil path L7 and the oil path L8. One preferred example of the oil path L which supplies oil to the housing space SS includes the oil path L1, the oil path L2, the oil path L3, the oil path L4, the oil path L5, the oil path L6, the oil path L7, and the oil path L8.

At least one oil path L9 is provided between the other end 3*d* of the inner member 3 and the other end surface 9*d* of the second supporting member 9. The oil path L9 is defined by a groove extending in a radial direction which is located at least in one of the other end 3*d* of the inner member 3 and the other end surface 9*d* of the second supporting member 9. A tubular oil path L10 which surrounds the inner member 3 along the outer circumference 3*a* of the inner member 3 is provided outside the inner member 3 in a radial direction. The oil path L9 communicatively connects the oil path L8 with the oil path L10 located outside the inner member 3 in a radial direction.

Inside the housing recessed portion 4*e* of the intermediate member 4, a housing space S1 which houses the first spring 6 is defined by the annular raised portion 8*g* of the first supporting member 8. An oil path L11 is provided in the annular raised portion 8*g* of the first supporting member 8. The oil path L11 communicatively connects the oil path L10 located outside the inner member 3 in a radial direction with the housing space S1. The oil path L11 is defined by a through hole 8*n* which penetrates through the annular raised portion 8*g*. One end of the through hole 8*n* is open at the inner circumference 8*j* of the annular raised portion 8*g*. The other end of the through hole 8*n* is open at the top portion 8*k* of the annular raised portion 8*g*. Inside the housing space SS, oil is supplied from the oil path L10 located outside the inner member 3 in a radial direction through the oil path L11 to the housing space S1 in which the first spring 6 is housed.

A housing space S2 to house the second spring 7 is provided inside the annular recessed portion 9*h* of the second supporting member 9. The oil path L10 located outside the inner member 3 in a radial direction is communicatively connected with the housing space S2. Inside the housing space SS, oil is supplied from the oil path L10 located outside the inner member 3 in a radial direction to the housing space S2 that houses the second spring 7. The second supporting member 9 provides an oil path L12 which communicatively connects the housing space S2 with the outside of the housing space SS. The oil path L12 is defined by a through hole which is open at the one end surface 9*c* of the second supporting member 9 and at the bottom of the annular recessed portion 9*h*.

According to this structural arrangement, the torque fluctuation absorber TFA includes the oil path L which supplies oil to the housing space SS. Therefore, each sliding portion of the torque fluctuation absorber TFA is lubricated and also cooled by the oil supplied to the housing space SS. When the intermediate member 4 is moved by a torque fluctuation in the first axial direction X1 and in the second axial direction X2, sliding of the first spring 6 with respect to an inner surface of the housing space S1 is lubricated. Sliding of the second spring 7 with respect to an inner surface of the housing space S2 is also lubricated. Further, sliding of the intermediate member 4 with respect to each of the first supporting member 8, the second supporting member 9, the inner member 3, and the outer member 5 is lubricated. Oil supplied to the housing space SS is discharged outside the housing space SS through a clearance provided between the first supporting member 8 and the outer member 5 (refer to the hollow arrow A1). The oil supplied to the housing space SS is discharged outside the housing space SS through a clearance provided between the second supporting member 9 and the outer member 5 (refer to the hollow arrow A2).

Further, a decrease in viscosity of the oil supplied to the housing space S1 that houses the first spring 6 improves a damping effect to absorb a torque fluctuation. A decrease in viscosity of the oil supplied to the housing space S2 that houses the second spring 7 improves a damping effect to absorb a torque fluctuation.

Figure 14:
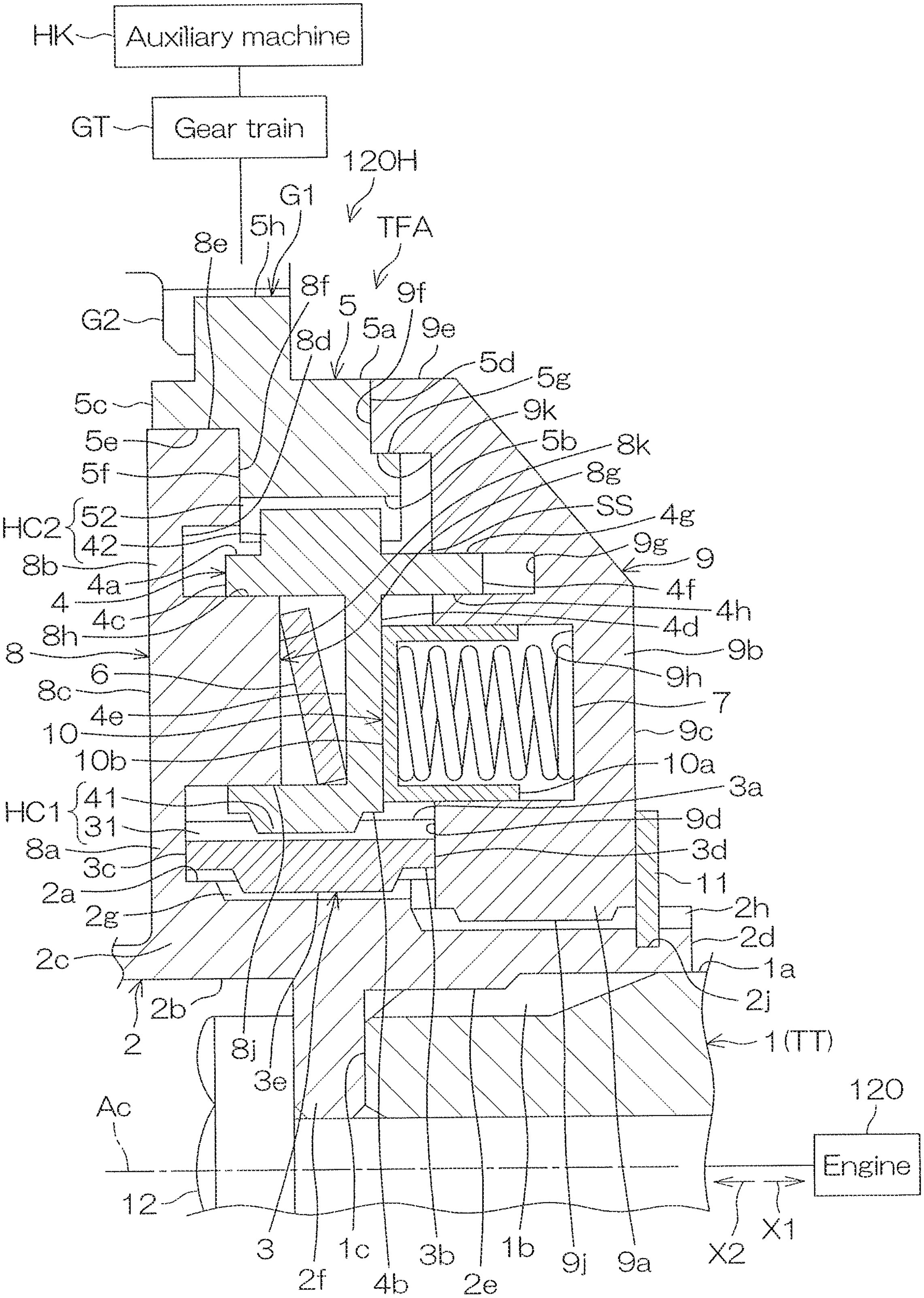
FIG. 14 is an enlarged cross-sectional view which shows major components of a torque fluctuation absorber in an auxiliary machine-equipped engine according to a preferred embodiment of the present invention.

FIG. 14 shows an auxiliary machine-equipped engine 120H as a preferred embodiment of the present invention. The auxiliary machine-equipped engine 120H includes an engine 120 including a crank shaft 1 and an auxiliary machine HK including an input shaft (not shown). A preferred example of the auxiliary machine HK may be a supercharger or may be an alternator. The auxiliary machine-equipped engine 120H further includes a gear train GT which includes a plurality of gears to transmit a driving force from the crank shaft 1 to the auxiliary machine HK and a torque fluctuation absorber TFA which absorbs a fluctuation in torque transmitted to the gear train GT. The torque fluctuation absorber TFA includes a first outer helical spline 31, an intermediate member 4, an outer member 5, a first spring 6, and a second spring 7. The first outer helical spline 31 rotates integrally with a torque transmission shaft TT which includes at least one of the crank shaft 1, the input shaft, and an intermediate shaft (not shown) which is located in a torque transmission path from the crank shaft 1 to the input shaft. The intermediate member 4 is ring-shaped, coaxially surrounds the torque transmission shaft TT, and is able to move in a first axial direction X1 and in a second axial direction X2 which is an opposite direction to the first axial direction X1. The intermediate member 4 has on an inner circumference 4*b* a first inner helical spline 41 which is engaged with the first outer helical spline 31 to provide a first helical spline coupling HC1 and has a second outer helical spline 42 on an outer circumference 4*a*. The outer member 5 is ring-shaped, coaxially surrounds the torque transmission shaft TT, and is regulated in axial movement with respect to the torque transmission shaft TT. The outer member 5 includes teeth on an outer circumference 5*a* thereof. The teeth mesh with corresponding gears of the gear train GT. The outer member 5 includes a second inner helical spline 52 on an inner circumference 5*b* thereof. The second inner helical spline 52 is engaged with a second outer helical spline 42 to provide a second helical spline coupling HC2. The first spring 6 biases the intermediate member 4 in the first axial direction X1. The second spring 7 biases the intermediate member 4 in the second axial direction X2.

According to this structural arrangement, the intermediate member 4 is linked with the torque transmission shaft TT through the first helical spline coupling HC1 and linked with the outer member 5 through the second helical spline coupling HC2. When a torque fluctuation occurs in the torque transmission path, due to actions of the first helical spline coupling HC1 and the second helical spline coupling HC2, the intermediate member 4 is moved in the second axial direction X2 in resistance to the first spring 6 or moved in the first axial direction X1 in resistance to the second spring 7. Therefore, it is possible to absorb a bidirectional torque fluctuation in the auxiliary machine-equipped engine 120H.

In the preferred examples so far described, although not shown, the first outer helical spline may be located on the outer circumference 2*a* of the base 2 or may be located on the outer circumference of the torque transmission shaft TT. Further, the torque fluctuation absorber TFA may be provided around at least one torque transmission shaft TT. Further, the first spring 6 and the second spring 7 may have an equal spring constant to each other, or the first spring 6 may have a smaller spring constant than the second spring 7. Further, the oil path L in the preferred modified example of FIG. 13 may be applied to the preferred modified example of FIG. 12 or the preferred embodiment of FIG. 14.

In the above-described preferred embodiments, an example which includes a jet pump is cited as the vessel propulsion apparatus. However, preferred embodiments of the present invention are applicable to other modes of vessel propulsion apparatuses such as outboard motors, inboard/outboard motors (stern drive, inboard motor/outboard drive), inboard motors, etc. Various features so far described may be used in combination whenever appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vessel propulsion apparatus comprising:
an engine including a crank shaft;
a supercharger including an input shaft;
a gear train including a plurality of gears to transmit a driving force from the crank shaft to the supercharger; and
a torque fluctuation absorber to absorb a fluctuation in torque transmitted to the gear train, the torque fluctuation absorber including:
a first outer helical spline rotatable integrally with a torque transmission shaft that includes at least one of the crank shaft, the input shaft, and an intermediate shaft located in a torque transmission path from the crank shaft to the input shaft;
an intermediate member that coaxially surrounds the torque transmission shaft and is able to move in a first axial direction and in a second axial direction opposite to the first axial direction, the intermediate member including a first inner helical spline on an inner circumference thereof and a second outer helical spline on an outer circumference thereof, the first inner helical spline being engaged with the first outer helical spline to provide a first helical spline coupling;

an outer member that coaxially surrounds the torque transmission shaft and is regulated in axial movement with respect to the torque transmission shaft, the outer member including teeth on an outer circumference thereof and a second inner helical spline on an inner circumference thereof, the teeth being meshed with corresponding gears of the gear train and the second inner helical spline being engaged with the second outer helical spline to provide a second helical spline coupling;

a first spring to bias the intermediate member in the first axial direction; and a second spring to bias the intermediate member in the second axial direction.

2. The vessel propulsion apparatus according to claim 1, further comprising:

an inner member that coaxially surrounds the torque transmission shaft and is regulated in axial movement with respect to the torque transmission shaft and is rotatable integrally with the torque transmission shaft; wherein the first outer helical spline is provided on an outer circumference of the inner member.

3. The vessel propulsion apparatus according to claim 2, wherein the torque fluctuation absorber further includes:

a base that coaxially surrounds the torque transmission shaft and is fixed to the torque transmission shaft, and on an outer circumference of which the inner member is held so as to be rotatable integrally while being regulated in axial movement; and a first support and a second support each of which includes an annular linkage that is linked with the base while being regulated in axial movement with respect to the base and an annular extension that extends outward in a radial direction from the annular linkage, the first support and the second support regulating an axial movement of the outer member between the respective annular extensions;

the first spring is interposed between the annular extension of the first support and the intermediate member; and the second spring is interposed between the annular extension of the second support and the intermediate member.

4. The vessel propulsion apparatus according to claim 3, wherein at least one of the annular extension of the first support and the annular extension of the second support supports the outer member so as to be rotatable coaxially with the torque transmission shaft.

5. The vessel propulsion apparatus according to claim 3, wherein one of the annular extension of the first support and the annular extension of the second support supports the outer circumference of the outer member so as to be rotatable coaxially with the torque transmission shaft; and the other of the annular extension of the first support and the annular extension of the second support supports the inner circumference of the outer member so as to be rotatable coaxially with the torque transmission shaft.

6. The vessel propulsion apparatus according to claim 3, wherein at least one of the annular extension of the first support and the annular extension of the second support supports the intermediate member so as to be rotatable coaxially with the torque transmission shaft.

7. The vessel propulsion apparatus according to claim 3, wherein one of the first support and the second support is unitary and integral with the base; and the other of the first support and the second support is fitted onto the outer circumference of the base and supported while being regulated in axial movement with respect to the base.

8. The vessel propulsion apparatus according to claim 3, wherein the torque fluctuation absorber further includes a housing which houses the inner member, the intermediate member, the first spring, and the second spring; and the housing is defined by the base, the outer member, the first support, and the second support.

9. The vessel propulsion apparatus according to claim 3, wherein the torque fluctuation absorber further includes a sub-assembly which includes the base, the inner member, the intermediate member, the outer member, the first spring, and the second spring.

10. The vessel propulsion apparatus according to claim 1, wherein the first spring and the second spring have different spring constants from each other.

11. The vessel propulsion apparatus according to claim 10, wherein the first spring has a larger spring constant than the second spring.

12. The vessel propulsion apparatus according to claim 11, wherein the first spring includes a disc spring, and the second spring includes a helical compression spring.

13. The vessel propulsion apparatus according to claim 11, wherein at least one of the first inner helical spline and the second outer helical spline is inclined with respect to a central axis of the intermediate member so that the intermediate member is moved in the second axial direction which is a direction in which the first spring is compressed when a positive torque is transmitted from the crank shaft to the supercharger.

14. A vessel comprising:

the vessel propulsion apparatus according to claim 1.

15. An auxiliary machine-equipped engine comprising:

an engine including a crank shaft;

an auxiliary machine including an input shaft;

a gear train including a plurality of gears to transmit a driving force from the crank shaft to the auxiliary machine; and a torque fluctuation absorber to absorb a fluctuation in torque transmitted to the gear train, the torque fluctuation absorber including:

a first outer helical spline rotatable integrally with a torque transmission shaft that includes at least one of the crank shaft, the input shaft, and an intermediate shaft located in a torque transmission path from the crank shaft to the input shaft;

an intermediate member that coaxially surrounds the torque transmission shaft and is able to move in a first axial direction and in a second axial direction opposite to the first axial direction, the intermediate member including a first inner helical spline on an inner circumference thereof and a second outer helical spline on an outer circumference thereof, the first inner helical spline being engaged with the first outer helical spline to provide a first helical spline coupling;

an outer member that coaxially surrounds the torque transmission shaft and is regulated in axial movement with respect to the torque transmission shaft, the outer member including teeth on an outer circumference thereof and a second inner helical spline on an inner circumference thereof, the teeth being meshed with corresponding gears of the gear train, the second inner helical spline being engaged with the second outer helical spline to provide a second helical spline coupling;

a first spring to bias the intermediate member in the first axial direction; and a second spring to bias the intermediate member in the second axial direction.

16. A torque fluctuation absorber to absorb a fluctuation in torque transmitted to a gear train including a plurality of gears, the torque fluctuation absorber comprising:

a first outer helical spline rotatable integrally with a torque transmission shaft;

an intermediate member that coaxially surrounds the torque transmission shaft and is able to move in a first axial direction and in a second axial direction opposite to the first axial direction, the intermediate member including a first inner helical spline on an inner circumference thereof and a second outer helical spline on an outer circumference thereof, the first inner helical spline being engaged with the first outer helical spline to provide a first helical spline coupling;

an outer member that coaxially surrounds the torque transmission shaft and is regulated in axial movement with respect to the torque transmission shaft, the outer member including teeth on an outer circumference thereof and a second inner helical spline on an inner circumference thereof, the teeth being meshed with corresponding gears of the gear train, the second inner helical spline being engaged with the second outer helical spline to provide a second helical spline coupling;

a first spring to bias the intermediate member in the first axial direction; and a second spring to bias the intermediate member in the second axial direction.

* * * * *